United States Patent
Wei et al.

(10) Patent No.: US 11,455,227 B2
(45) Date of Patent: Sep. 27, 2022

(54) SYSTEMS AND METHODS FOR EXPEDITED ACCESS TO APPLICATIONS

(71) Applicant: Citrix Systems, Inc., Fort Lauderdale, FL (US)

(72) Inventors: Daowen Wei, Nanjing (CN); Jian Ding, Nanjing (CN); Hengbo Wang, Nanjing (CN)

(73) Assignee: Citrix Systems, Inc., Fort Lauderdale, FL (US)

( * ) Notice: Subject to any disclaimer, the term of this patent is extended or adjusted under 35 U.S.C. 154(b) by 273 days.

(21) Appl. No.: 16/822,900

(22) Filed: Mar. 18, 2020

(65) Prior Publication Data
US 2021/0248053 A1      Aug. 12, 2021

Related U.S. Application Data

(63) Continuation of application No. PCT/CN2020/074734, filed on Feb. 11, 2020.

(51) Int. Cl.
*G06F 9/451* (2018.01)
*G06F 11/34* (2006.01)
(Continued)

(52) U.S. Cl.
CPC .......... *G06F 11/3404* (2013.01); *G06F 9/451* (2018.02); *G06F 9/5077* (2013.01);
(Continued)

(58) Field of Classification Search
CPC ............... G06F 11/3404; G06F 9/5077; G06F 2201/865; G06F 9/451; G06K 9/6269; H04L 63/104
See application file for complete search history.

(56) References Cited

U.S. PATENT DOCUMENTS 10,872,024 B2 * 12/2020 Cranfill ................. H04L 63/102
2016/0171589 A1 * 6/2016 Glover ............... G06Q 30/0631
705/26.7
(Continued)

FOREIGN PATENT DOCUMENTS

CN           104504149 A        4/2015
CN           106997358 A        8/2017
(Continued)

OTHER PUBLICATIONS

Oct. 29, 2020—(WO) Written Opinion and International Search Report—App PCT/CN2020/074734.

*Primary Examiner* — Anil K Bhargava
(74) *Attorney, Agent, or Firm* — Banner & Witcoff, Ltd.

(57) ABSTRACT

Methods and systems for determining information of applications are described herein. A computing device may receive, from one or more client devices, data indicating application usage events. The computing device may determine, based on the data, popular applications that a target user regularly uses. The computing device may determine, based on the data, recommended applications that users similar to the target user regularly use. The computing device may determine, based on the popular applications and/or the recommended applications, a collection of applications for the target user. The collection of applications may be displayed on a user interface of a client device associated with the target user for expedited access of interested applications.

18 Claims, 19 Drawing Sheets

(51) Int. Cl.
*G06F 9/50* (2006.01)
*G06K 9/62* (2022.01)
*H04L 9/40* (2022.01)

(52) U.S. Cl.
CPC .......... *G06K 9/6269* (2013.01); *H04L 63/104* (2013.01); *G06F 2201/865* (2013.01)

(56) References Cited

U.S. PATENT DOCUMENTS

| | | | |
|---|---|---|---|
| 2016/0191639 A1* | 6/2016 | Dai | H04L 67/306 |
| | | | 709/204 |
| 2017/0085678 A1* | 3/2017 | Babu | H04L 67/306 |
| 2017/0097743 A1* | 4/2017 | Hameed | G06F 3/0484 |
| 2017/0351388 A1* | 12/2017 | Grunewald | H04M 1/72406 |
| 2017/0353815 A1* | 12/2017 | Jagannathan | H04M 1/72472 |
| 2019/0369842 A1* | 12/2019 | Dolbakian | G06F 3/04883 |
| 2021/0004682 A1* | 1/2021 | Gong | G06N 3/08 |
| 2021/0109836 A1* | 4/2021 | Cranfill | G06F 21/6218 |
| 2021/0278956 A1* | 9/2021 | Dolbakian | G06F 3/04817 |

FOREIGN PATENT DOCUMENTS

| | | |
|---|---|---|
| CN | 108536694 A | 9/2018 |
| CN | 110377821 A | 10/2019 |
| WO | 2018157818 A1 | 9/2018 |

* cited by examiner

|         | Team 1 | Team 3 | Team 4 | Team 7 |
|---------|--------|--------|--------|--------|
| Team 1  | 0      | 2      | 0      | 3      |
| Team 3  | 2      | 0      | 0      | 1      |
| Team 4  | 0      | 0      | 0      | 0      |
| Team 7  | 3      | 1      | 0      | 0      |

FIG. 15

SYSTEMS AND METHODS FOR EXPEDITED ACCESS TO APPLICATIONS

CROSS-REFERENCE TO RELATED APPLICATIONS

This application claims priority to PCT International Application No. PCT/CN2020/074734, filed Feb. 11, 2020, and entitled "SYSTEMS AND METHODS FOR EXPEDITED ACCESS TO APPLICATIONS," which is hereby incorporated by reference in its entirety.

FIELD

Aspects described herein generally relate to computer networking, remote computer access, virtualization, and hardware and software related thereto. More specifically, one or more aspects are described for user interfaces, in which to access applications.

BACKGROUND

Enterprises are increasingly adopting cloud computing services, which may provide various services to users. The users may be provided with a plurality of applications that they are allowed to access. And the users may select, from the plurality of applications, one or more applications that they are interested in accessing.

SUMMARY

The following presents a simplified summary of various aspects described herein. This summary is not an extensive overview, and is not intended to identify required or critical elements or to delineate the scope of the claims. The following summary merely presents some concepts in a simplified form as an introductory prelude to the more detailed description provided below.

Aspects described herein are directed towards methods and systems for dynamically determining application information for generating user interfaces for expedited access to applications. A computing device may identify applications launched by a first client device, the identification including a determination of an amount of time in which individual applications were in use on the first client device. The computing device may determine a usage score of the identified applications of the first client device based on the determined amount of time in which the individual applications were in use. The computing device may identify other client devices based on the determined usage score of the identified applications launched by the first client device. The computing device may determine at least one recommended application to make accessible to the first client device, the at least one recommended application being an application of at least one of the identified other client devices. The computing device may provide access to the at least one recommended application via a user interface of the first client device so as to reduce time in which to launch the at least one recommended application via the first client device.

In some examples, the computing device may receive, from the first client device, data indicating an application usage event. The application usage event may indicate a first application outputted via the first client device and a time interval during which the first application was outputted via the first client device.

In some examples, the amount of time in which the individual applications were in use on the first client device may indicate an amount of time during which the individual applications were outputted via an active window of a desktop of the first client device.

In some examples, the amount of time in which the individual applications were in use on the first client device may indicate an amount of time within a first calculation period. The computing device may determine the usage score of the identified applications of the first client device based on one or more amounts of time within one or more second calculation periods.

In some examples, the computing device may assign different weights to the amount of time within the first calculation period and the one or more amounts of time within the one or more second calculation periods. The computing device may determine the usage score of the identified applications of the first client device based on the different weights.

In some examples, the computing device may determine the usage score of the identified applications of the first client device based on a previous usage score of the identified applications of the first client device.

In some examples, the computing device may determine the usage score of the identified applications of the first client device by assigning a first weight to the amount of time in which the individual applications were in use on the first client device, and by assigning a second weight to the previous usage score of the identified applications of the first client device.

In some examples, the first weight and the second weight may be determined based on a number of times that the determining the usage score of the identified applications of the first client device is performed.

In some examples, the computing device may receive, from a directory service, data indicating a plurality of user groups. The computing device may determine, from the plurality of user groups, a first user group associated with the first client device. The computing device may determine, from the plurality of user groups, one or more second user groups associated with similar group application usage attributes as the first user group. The other client devices may be associated with users of the one or more second user groups.

In some examples, the computing device may determine the one or more second user groups by determining, for a second user group of the one or more second user groups, a set of applications used by the second user group, and by determining that a degree of overlap between the set of applications used by the second user group and a set of applications used by the first user group satisfies a threshold degree of overlap.

In some examples, the computing device may identify the other client devices by determining, for a client device of the other client devices, a vector of application usage attributes, wherein the vector indicates one or more amounts of application usage time, and by determining a distance between the vector for the client device of the other client devices and a vector for the first client device.

In some examples, the computing device may select, from the identified applications of the first client device and based on the usage score of the identified applications of the first client device, at least one top ranked application.

In some examples, the computing device may determine the at least one recommended application by determining the at least one recommended application other than the at least one top ranked application.

In some examples, the computing device may determine the usage score of the identified applications of the first client device based on a type of application usage of the identified applications of the first client device.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein:

FIG. 15 shows an example of a spare symmetric matrix with which features described herein may be implemented.

DETAILED DESCRIPTION

Figure 1:
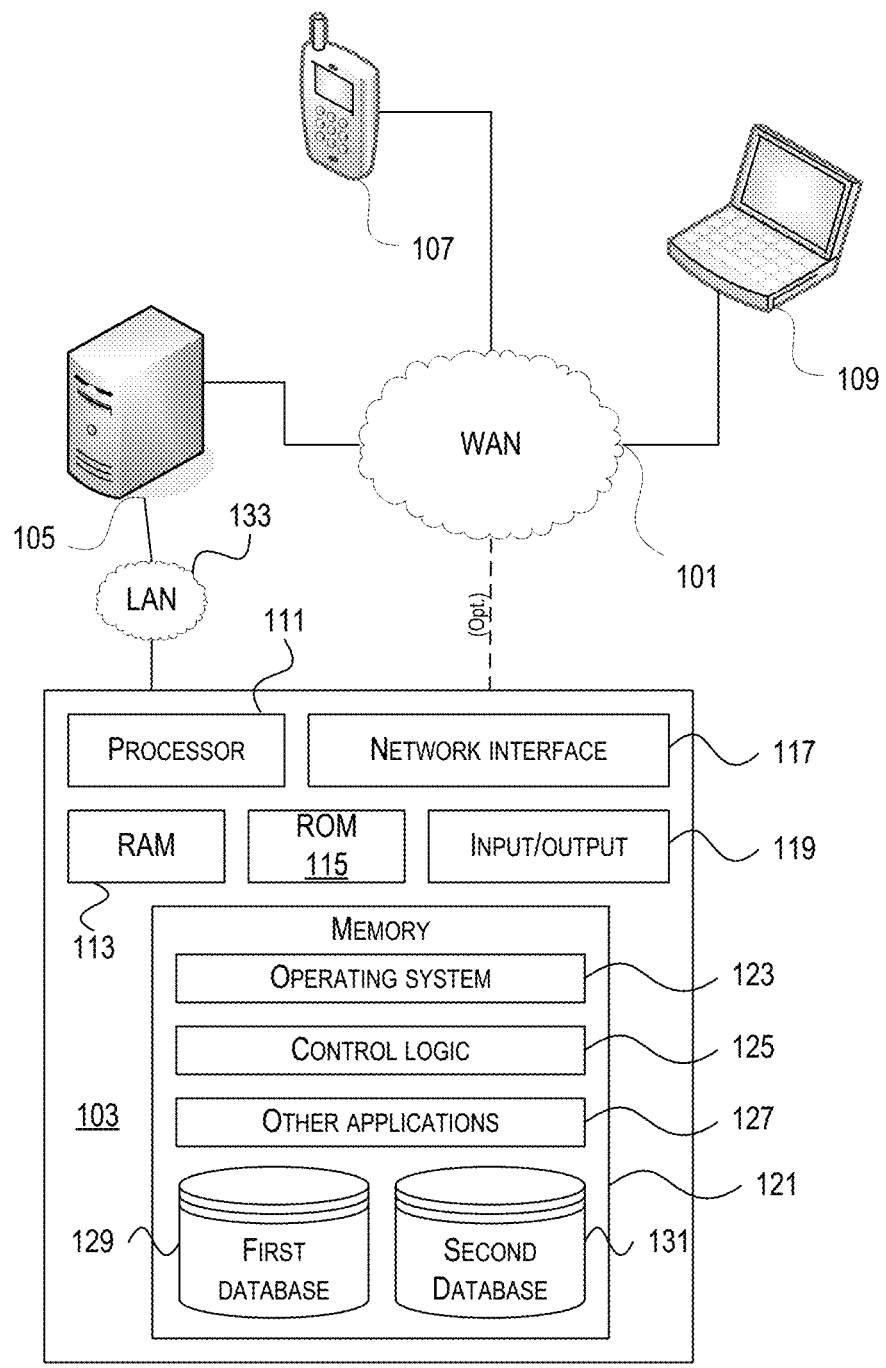
FIG. 1 depicts an illustrative computer system architecture that may be used in accordance with one or more illustrative aspects described herein.

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein are directed towards methods and systems for expedited access to applications. Cloud computing services may provide various services (e.g., virtual applications) to users. The users may be provided with a collection of applications that they are allowed to access. And the users may select, from the collection of applications, one or more applications that they are interested in accessing. The collection of applications may comprise a large number of applications, and/or may include applications that are not of interest to the users. This may contribute to causing a user taking a long time to access and launch an application. For example, users may have difficulty identifying, from the collection of applications, an application that the user may be interested in accessing. Enterprise organizations in which the user is a member may comprise a number of different departments (e.g., engineering department, accounting department, legal department, etc.), for example, may subscribe to applications that are of potential interest to all of its departments and/or members. The user may reside within a particular department. The user may be allowed to access all of the application subscribed by the enterprise organization. As a result, the collection of applications to be presented to the user may include applications of potential interest to other departments, but not of potential interest to the user.

Dynamically determining application information (e.g., indicating a collection of applications of interest to the user) for generating user interfaces for expedited access may help alleviate the challenges described above. Application information for a particular user may be determined, for example, based on the user's application usage behavior and/or other users' application usage behavior. The application information may indicate, for example, first applications that are regularly used by the user and/or second applications that are rarely used by the user but are regularly used by users having similar application usage patterns as the user. Including the first applications in the customized application information may facilitate the user's identification and/or activation of an application (e.g., application launch) that the user intends to access. Including the second applications in the application information may help introduce new applications of potential interest to the user, as these applications are regularly used by other similar users. Determining application information for generating user interfaces may help increase user convenience in accessing applications. The application information may be determined and/or updated dynamically (e.g., periodically) to adapt to changing user behavior. A computing device may receive, from one or more user devices, data indicating application usage events. The computing device may determine, based on the data, popular applications that a target user regularly uses. The computing device may determine, based on the data, recommended applications that users similar to the target user regularly use. The computing device may determine, based on the popular applications and/or the recommended applications, customized application information for the target user. The customized application information may be delivered to a user device associated with the target user, and may be used to generate a user interface on the user device, so that the user may have expedited access to interested applications. For example, applications indicated in the application information may be displayed as icons (and/or other types of identifiers) on the user interface, and the selection of such an icon may cause the user device (and/or associated computing devices) to implement the application corresponding to the icon and to present the implemented application to the user.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "connected," "coupled," and similar terms, is meant to include both direct and indirect mounting, connecting, coupling, positioning and engaging.

Computing Architecture

Computer software, hardware, and networks may be utilized in a variety of different system environments, including standalone, networked, remote-access (also known as remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LAN), metropolitan area networks (MAN), wireless networks, personal networks (PAN), and the like. Network 101 is for illustration purposes and may be replaced with fewer or additional computer networks. A local area network 133 may have one or more of any known LAN topology and may use one or more of a variety of different protocols, such as Ethernet. Devices 103, 105, 107, and 109 and other devices (not shown) may be connected to one or more of the networks via twisted pair wires, coaxial cable, fiber optics, radio waves, or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the local area network 133, the wide area network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the data server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic 125 may also be referred to herein as the data server software 125. Functionality of the data server software 125 may refer to operations or decisions made automatically based on rules coded into the control logic 125, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database 129 may include the second database 131 (e.g., as a separate table, report, etc.). That is, the information can be stored in a single database, or separated into different logical, virtual, or physical databases, depending on system design. Devices 105, 107, and 109 may have similar or different architecture as described with respect to device 103. Those of skill in the art will appreciate that the functionality of data processing device 103 (or device 105, 107, or 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, solid state storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware, and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
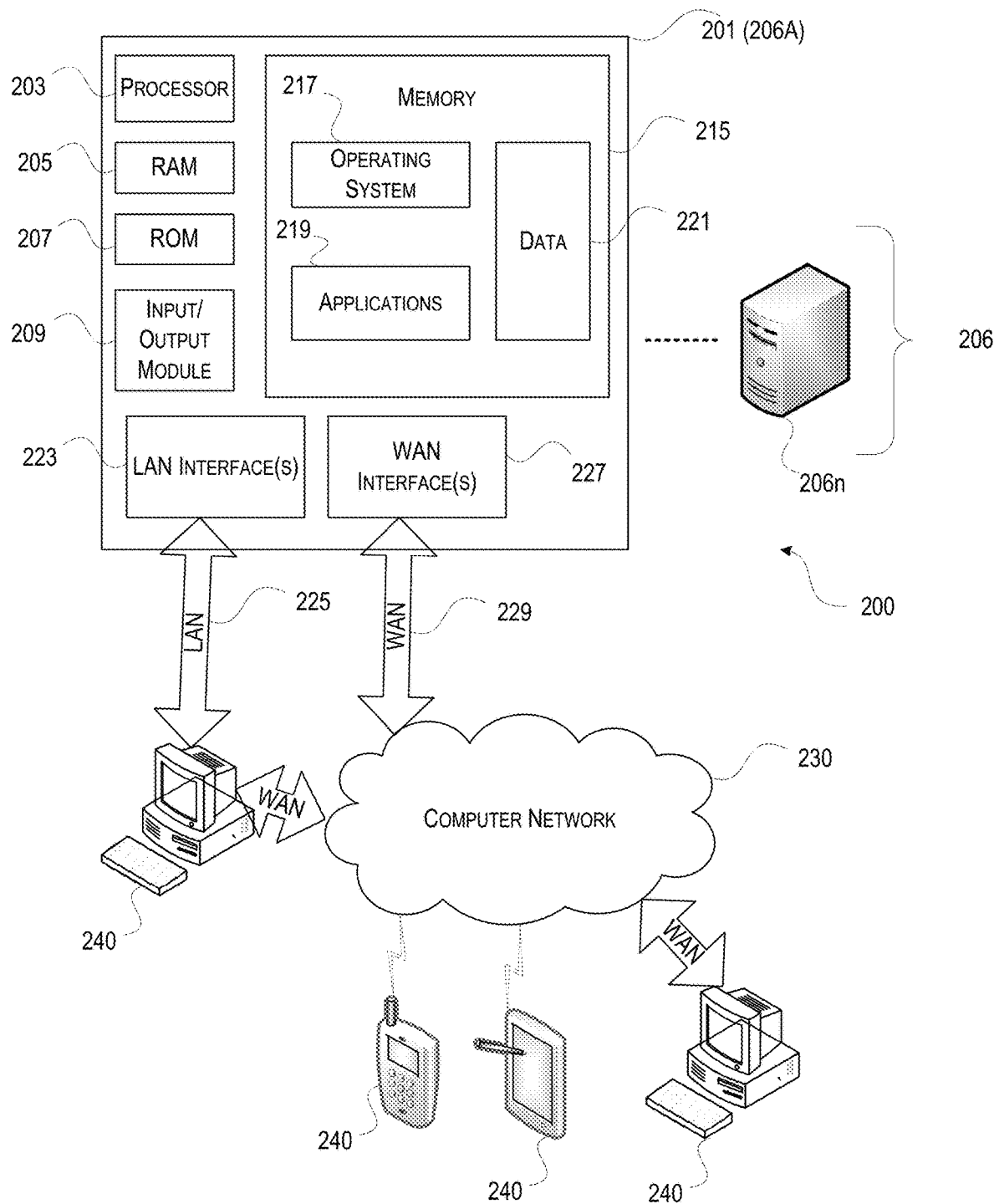
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a computing device 201 in an illustrative computing environment 200 that may be used according to one or more illustrative aspects described herein. Computing device 201 may be used as a server 206a in a single-server or multi-server desktop virtualization system (e.g., a remote access or cloud system) and can be configured to provide virtual machines for client access devices. The computing device 201 may have a processor 203 for controlling overall operation of the device 201 and its associated components, including RAM 205, ROM 207, Input/Output (I/O) module 209, and memory 215.

I/O module 209 may include a mouse, keypad, touch screen, scanner, optical reader, and/or stylus (or other input device(s)) through which a user of computing device 201 may provide input, and may also include one or more of a speaker for providing audio output and one or more of a video display device for providing textual, audiovisual, and/or graphical output. Software may be stored within memory 215 and/or other storage to provide instructions to processor 203 for configuring computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices and/or client machines). The terminals 240 may be personal computers, mobile devices, laptop computers, tablets, or servers that include many or all of the elements described above with respect to the computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem or other wide area network interface 227 for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in other aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 206a that receives requests from a client machine 240, forwards the request to a second server 206b (not shown), and responds to the request generated by the client machine 240 with a response from the second server 206b (not shown.) First server 206a may acquire an enumeration of applications available to the client machine 240 as well as address information associated with an application server 206 hosting an application identified within the enumeration of applications. First server 206a can then present a response to the client's request using a web interface, and communicate directly with the client 240 to provide the client 240 with access to an identified application. One or more clients 240 and/or one or more servers 206 may transmit data over network 230, e.g., network 101.

Figure 3:
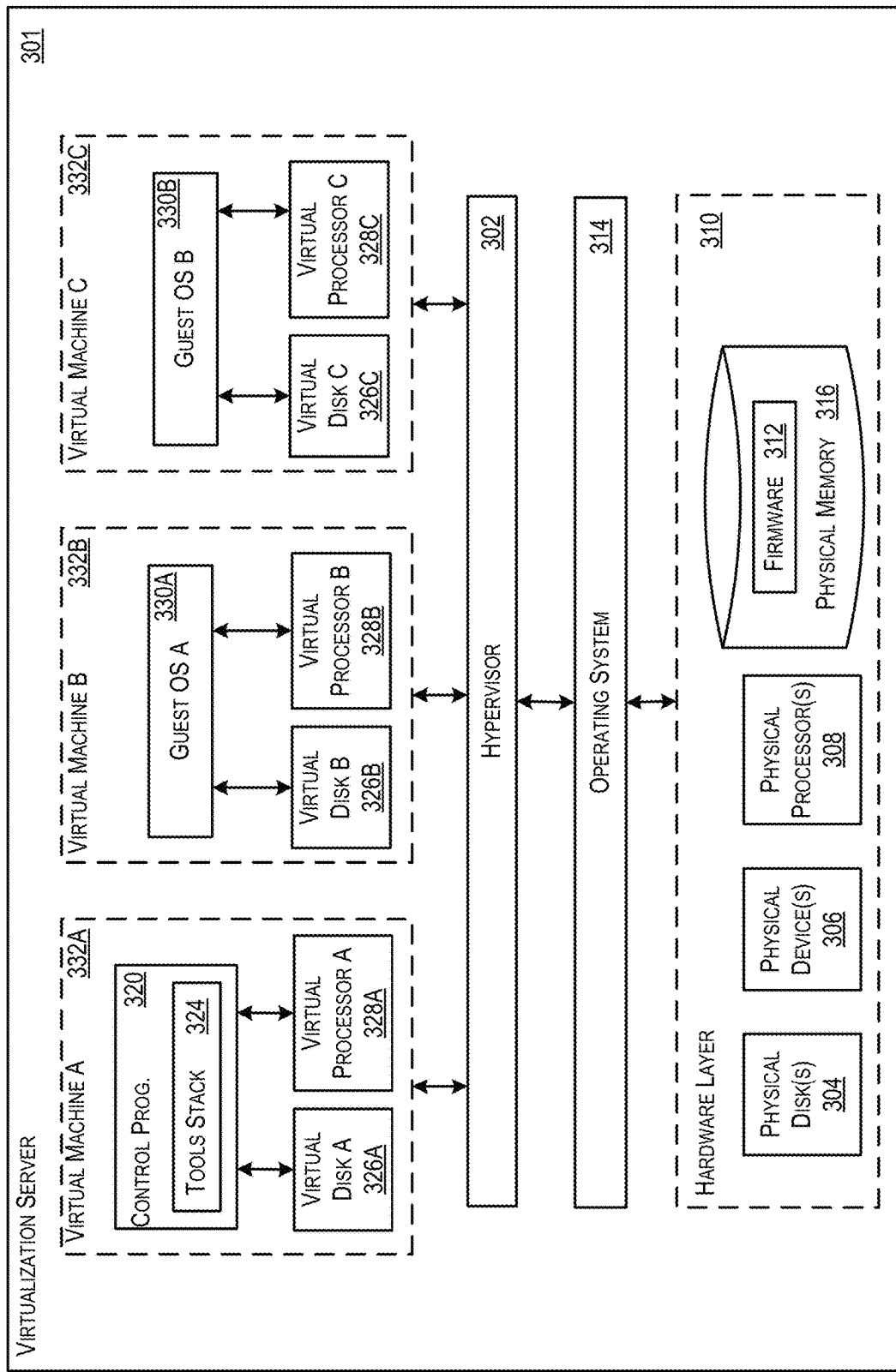
FIG. 3 depicts an illustrative virtualized system architecture that may be used in accordance with one or more illustrative aspects described herein.

FIG. 3 shows a high-level architecture of an illustrative desktop virtualization system. As shown, the desktop virtualization system may be single-server or multi-server system, or cloud system, including at least one virtualization server 301 configured to provide virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

A computer device 301 may be configured as a virtualization server in a virtualization environment, for example, a single-server, multi-server, or cloud computing environment. Virtualization server 301 illustrated in FIG. 3 can be deployed as and/or implemented by one or more embodiments of the server 206 illustrated in FIG. 2 or by other known computing devices. Included in virtualization server 301 is a hardware layer that can include one or more physical disks 304, one or more physical devices 306, one or more physical processors 308, and one or more physical memories 316. In some embodiments, firmware 312 can be stored within a memory element in the physical memory 316 and can be executed by one or more of the physical processors 308. Virtualization server 301 may further include an operating system 314 that may be stored in a memory element in the physical memory 316 and executed by one or more of the physical processors 308. Still further, a hypervisor 302 may be stored in a memory element in the physical memory 316 and can be executed by one or more of the physical processors 308.

Executing on one or more of the physical processors 308 may be one or more virtual machines 332A-C (generally 332). Each virtual machine 332 may have a virtual disk 326A-C and a virtual processor 328A-C. In some embodiments, a first virtual machine 332A may execute, using a virtual processor 328A, a control program 320 that includes a tools stack 324. Control program 320 may be referred to as a control virtual machine, Dom0, Domain 0, or other virtual machine used for system administration and/or control. In some embodiments, one or more virtual machines 332B-C can execute, using a virtual processor 328B-C, a guest operating system 330A-B.

Virtualization server 301 may include a hardware layer 310 with one or more pieces of hardware that communicate with the virtualization server 301. In some embodiments, the hardware layer 310 can include one or more physical disks 304, one or more physical devices 306, one or more physical processors 308, and one or more physical memory 316. Physical components 304, 306, 308, and 316 may include, for example, any of the components described above. Physical devices 306 may include, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with virtualization server 301. Physical memory 316 in the hardware layer 310 may include any type of memory. Physical memory 316 may store data, and in some embodiments may store one or more programs, or set of executable instructions. FIG. 3 illustrates an embodiment where firmware 312 is stored within the physical memory 316 of virtualization server 301. Programs or executable instructions stored in the physical memory 316 can be executed by the one or more processors 308 of virtualization server 301.

Virtualization server 301 may also include a hypervisor 302. In some embodiments, hypervisor 302 may be a program executed by processors 308 on virtualization server 301 to create and manage any number of virtual machines 332. Hypervisor 302 may be referred to as a virtual machine monitor, or platform virtualization software. In some embodiments, hypervisor 302 can be any combination of executable instructions and hardware that monitors virtual machines executing on a computing machine. Hypervisor 302 may be Type 2 hypervisor, where the hypervisor executes within an operating system 314 executing on the virtualization server 301. Virtual machines may then execute at a level above the hypervisor 302. In some embodiments, the Type 2 hypervisor may execute within the context of a user's operating system such that the Type 2 hypervisor interacts with the user's operating system. In other embodiments, one or more virtualization servers 301 in a virtualization environment may instead include a Type 1 hypervisor (not shown). A Type 1 hypervisor may execute on the virtualization server 301 by directly accessing the hardware and resources within the hardware layer 310. That is, while a Type 2 hypervisor 302 accesses system resources through a host operating system 314, as shown, a Type 1 hypervisor may directly access all system resources without the host operating system 314. A Type 1 hypervisor may execute directly on one or more physical processors 308 of virtualization server 301, and may include program data stored in the physical memory 316.

Hypervisor 302, in some embodiments, can provide virtual resources to operating systems 330 or control programs 320 executing on virtual machines 332 in any manner that simulates the operating systems 330 or control programs 320 having direct access to system resources. System resources can include, but are not limited to, physical devices 306, physical disks 304, physical processors 308, physical memory 316, and any other component included in hardware layer 310 of the virtualization server 301. Hypervisor 302 may be used to emulate virtual hardware, partition physical hardware, virtualize physical hardware, and/or execute virtual machines that provide access to computing environments. In still other embodiments, hypervisor 302 may control processor scheduling and memory partitioning for a virtual machine 332 executing on virtualization server 301. Hypervisor 302 may include those manufactured by VMWare, Inc., of Palo Alto, Calif.; HyperV, VirtualServer or virtual PC hypervisors provided by Microsoft, or others. In some embodiments, virtualization server 301 may execute a hypervisor 302 that creates a virtual machine platform on which guest operating systems may execute. In these embodiments, the virtualization server 301 may be referred to as a host server. An example of such a virtualization server is the Citrix Hypervisor provided by Citrix Systems, Inc., of Fort Lauderdale, Fla.

Hypervisor 302 may create one or more virtual machines 332B-C (generally 332) in which guest operating systems 330 execute. In some embodiments, hypervisor 302 may load a virtual machine image to create a virtual machine 332. In other embodiments, the hypervisor 302 may execute a guest operating system 330 within virtual machine 332. In still other embodiments, virtual machine 332 may execute guest operating system 330.

In addition to creating virtual machines 332, hypervisor 302 may control the execution of at least one virtual machine 332. In other embodiments, hypervisor 302 may present at least one virtual machine 332 with an abstraction of at least one hardware resource provided by the virtualization server 301 (e.g., any hardware resource available within the hardware layer 310). In other embodiments, hypervisor 302 may control the manner in which virtual machines 332 access physical processors 308 available in virtualization server 301. Controlling access to physical processors 308 may include determining whether a virtual machine 332 should have access to a processor 308, and how physical processor capabilities are presented to the virtual machine 332.

As shown in FIG. 3, virtualization server 301 may host or execute one or more virtual machines 332. A virtual machine 332 is a set of executable instructions that, when executed by a processor 308, may imitate the operation of a physical computer such that the virtual machine 332 can execute programs and processes much like a physical computing device. While FIG. 3 illustrates an embodiment where a virtualization server 301 hosts three virtual machines 332, in other embodiments virtualization server 301 can host any number of virtual machines 332. Hypervisor 302, in some embodiments, may provide each virtual machine 332 with a unique virtual view of the physical hardware, memory, processor, and other system resources available to that virtual machine 332. In some embodiments, the unique virtual view can be based on one or more of virtual machine permissions, application of a policy engine to one or more virtual machine identifiers, a user accessing a virtual machine, the applications executing on a virtual machine, networks accessed by a virtual machine, or any other desired criteria. For instance, hypervisor 302 may create one or more unsecure virtual machines 332 and one or more secure virtual machines 332. Unsecure virtual machines 332 may be prevented from accessing resources, hardware, memory locations, and programs that secure virtual machines 332 may be permitted to access. In other embodiments, hypervisor 302 may provide each virtual machine 332 with a substantially similar virtual view of the physical hardware, memory, processor, and other system resources available to the virtual machines 332.

Each virtual machine 332 may include a virtual disk 326A-C (generally 326) and a virtual processor 328A-C (generally 328.) The virtual disk 326, in some embodiments, is a virtualized view of one or more physical disks 304 of the virtualization server 301, or a portion of one or more physical disks 304 of the virtualization server 301. The virtualized view of the physical disks 304 can be generated, provided, and managed by the hypervisor 302. In some embodiments, hypervisor 302 provides each virtual machine 332 with a unique view of the physical disks 304. Thus, in these embodiments, the particular virtual disk 326 included in each virtual machine 332 can be unique when compared with the other virtual disks 326.

A virtual processor 328 can be a virtualized view of one or more physical processors 308 of the virtualization server 301. In some embodiments, the virtualized view of the physical processors 308 can be generated, provided, and managed by hypervisor 302. In some embodiments, virtual processor 328 has substantially all of the same characteristics of at least one physical processor 308. In other embodiments, virtual processor 308 provides a modified view of physical processors 308 such that at least some of the characteristics of the virtual processor 328 are different than the characteristics of the corresponding physical processor 308.

Figure 4:
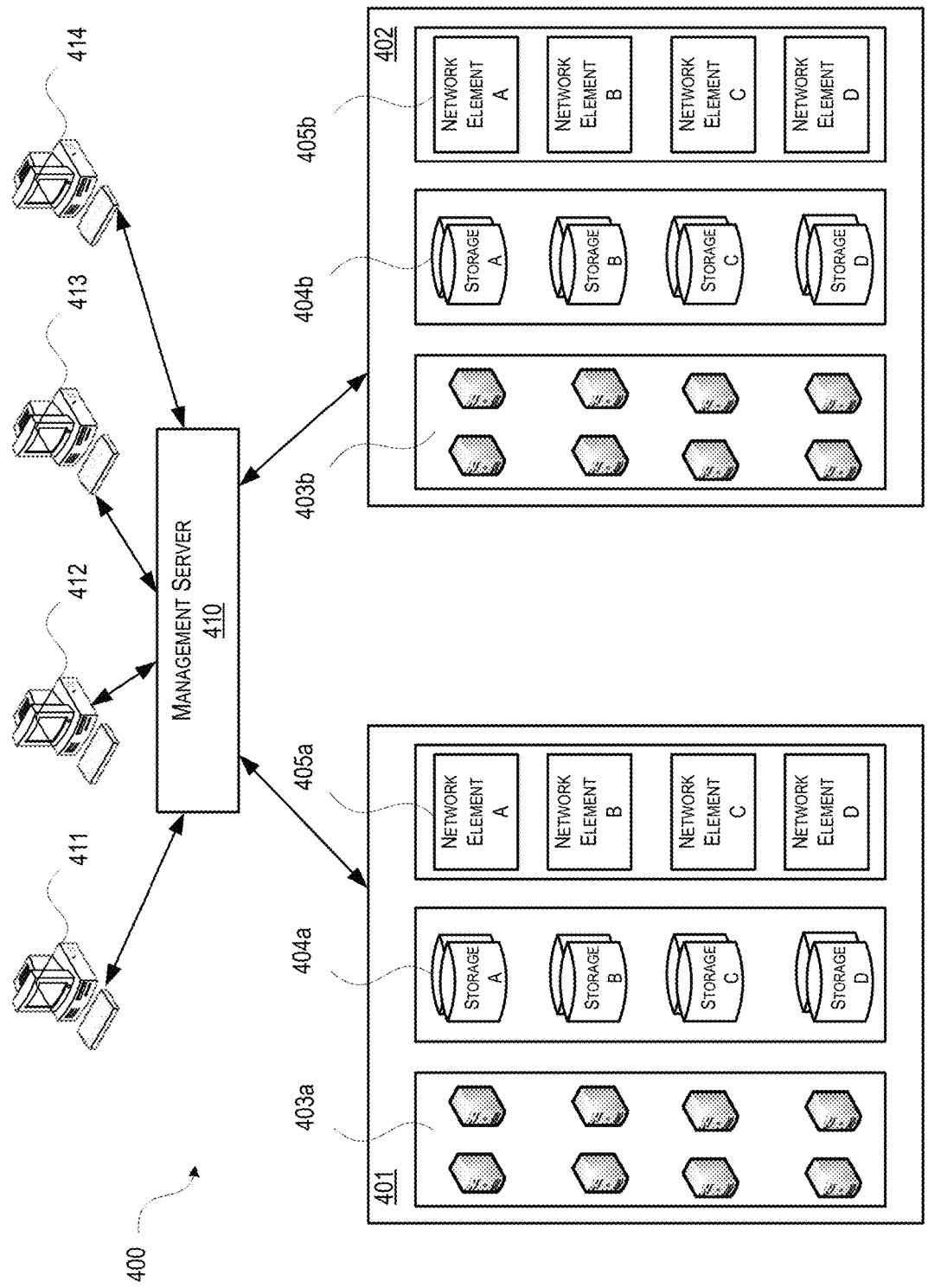
FIG. 4 depicts an illustrative cloud-based system architecture that may be used in accordance with one or more illustrative aspects described herein.

With further reference to FIG. 4, some aspects described herein may be implemented in a cloud-based environment. FIG. 4 illustrates an example of a cloud computing environment (or cloud system) 400. As seen in FIG. 4, client computers 411-414 may communicate with a cloud management server 410 to access the computing resources (e.g., host servers 403a-403b (generally referred herein as "host servers 403"), storage resources 404a-404b (generally referred herein as "storage resources 404"), and network elements 405a-405b (generally referred herein as "network resources 405")) of the cloud system.

Management server 410 may be implemented on one or more physical servers. The management server 410 may run, for example, Citrix Cloud by Citrix Systems, Inc. of Ft. Lauderdale, Fla., or OPENSTACK, among others. Management server 410 may manage various computing resources, including cloud hardware and software resources, for example, host computers 403, data storage devices 404, and networking devices 405. The cloud hardware and software resources may include private and/or public components. For example, a cloud may be configured as a private cloud to be used by one or more particular customers or client computers 411-414 and/or over a private network. In other embodiments, public clouds or hybrid public-private clouds may be used by other customers over an open or hybrid networks.

Management server 410 may be configured to provide user interfaces through which cloud operators and cloud customers may interact with the cloud system 400. For example, the management server 410 may provide a set of application programming interfaces (APIs) and/or one or more cloud operator console applications (e.g., web-based or standalone applications) with user interfaces to allow cloud operators to manage the cloud resources, configure the virtualization layer, manage customer accounts, and perform other cloud administration tasks. The management server 410 also may include a set of APIs and/or one or more customer console applications with user interfaces configured to receive cloud computing requests from end users via client computers 411-414, for example, requests to create, modify, or destroy virtual machines within the cloud. Client computers 411-414 may connect to management server 410 via the Internet or some other communication network, and may request access to one or more of the computing resources managed by management server 410. In response to client requests, the management server 410 may include a resource manager configured to select and provision physical resources in the hardware layer of the cloud system based on the client requests. For example, the management server 410 and additional components of the cloud system may be configured to provision, create, and manage virtual machines and their operating environments (e.g., hypervisors, storage resources, services offered by the network elements, etc.) for customers at client computers 411-414, over a network (e.g., the Internet), providing customers with computational resources, data storage services, networking capabilities, and computer platform and application support. Cloud systems also may be configured to provide various specific services, including security systems, development environments, user interfaces, and the like.

Certain clients 411-414 may be related, for example, to different client computers creating virtual machines on behalf of the same end user, or different users affiliated with the same company or organization. In other examples, certain clients 411-414 may be unrelated, such as users affiliated with different companies or organizations. For unrelated clients, information on the virtual machines or storage of any one user may be hidden from other users.

Referring now to the physical hardware layer of a cloud computing environment, availability zones 401-402 (or zones) may refer to a collocated set of physical computing resources. Zones may be geographically separated from other zones in the overall cloud of computing resources. For example, zone 401 may be a first cloud datacenter located in California, and zone 402 may be a second cloud datacenter located in Florida. Management server 410 may be located at one of the availability zones, or at a separate location. Each zone may include an internal network that interfaces with devices that are outside of the zone, such as the management server 410, through a gateway. End users of the cloud (e.g., clients 411-414) might or might not be aware of the distinctions between zones. For example, an end user may request the creation of a virtual machine having a specified amount of memory, processing power, and network capabilities. The management server 410 may respond to the user's request and may allocate the resources to create the virtual machine without the user knowing whether the virtual machine was created using resources from zone 401 or zone 402. In other examples, the cloud system may allow end users to request that virtual machines (or other cloud resources) are allocated in a specific zone or on specific resources 403-405 within a zone.

In this example, each zone 401-402 may include an arrangement of various physical hardware components (or computing resources) 403-405, for example, physical hosting resources (or processing resources), physical network resources, physical storage resources, switches, and additional hardware resources that may be used to provide cloud computing services to customers. The physical hosting resources in a cloud zone 401-402 may include one or more computer servers 403, such as the virtualization servers 301 described above, which may be configured to create and host virtual machine instances. The physical network resources in a cloud zone 401 or 402 may include one or more network elements 405 (e.g., network service providers) comprising hardware and/or software configured to provide a network service to cloud customers, such as firewalls, network address translators, load balancers, virtual private network (VPN) gateways, Dynamic Host Configuration Protocol (DHCP) routers, and the like. The storage resources in the cloud zone 401-402 may include storage disks (e.g., solid state drives (SSDs), magnetic hard disks, etc.) and other storage devices.

The example cloud computing environment shown in FIG. 4 also may include a virtualization layer (e.g., as shown in FIGS. 1-3) with additional hardware and/or software resources configured to create and manage virtual machines and provide other services to customers using the physical resources in the cloud. The virtualization layer may include hypervisors, as described above in FIG. 3, along with other components to provide network virtualizations, storage virtualizations, etc. The virtualization layer may be as a separate layer from the physical resource layer, or may share some or all of the same hardware and/or software resources with the physical resource layer. For example, the virtualization layer may include a hypervisor installed in each of the virtualization servers 403 with the physical computing resources. Known cloud systems may alternatively be used, e.g., WINDOWS AZURE (Microsoft Corporation of Redmond Wash.), AMAZON EC2 (Amazon.com Inc. of Seattle, Wash.), IBM BLUE CLOUD (IBM Corporation of Armonk, N.Y.), or others.

Enterprise Mobility Management Architecture

Figure 5:
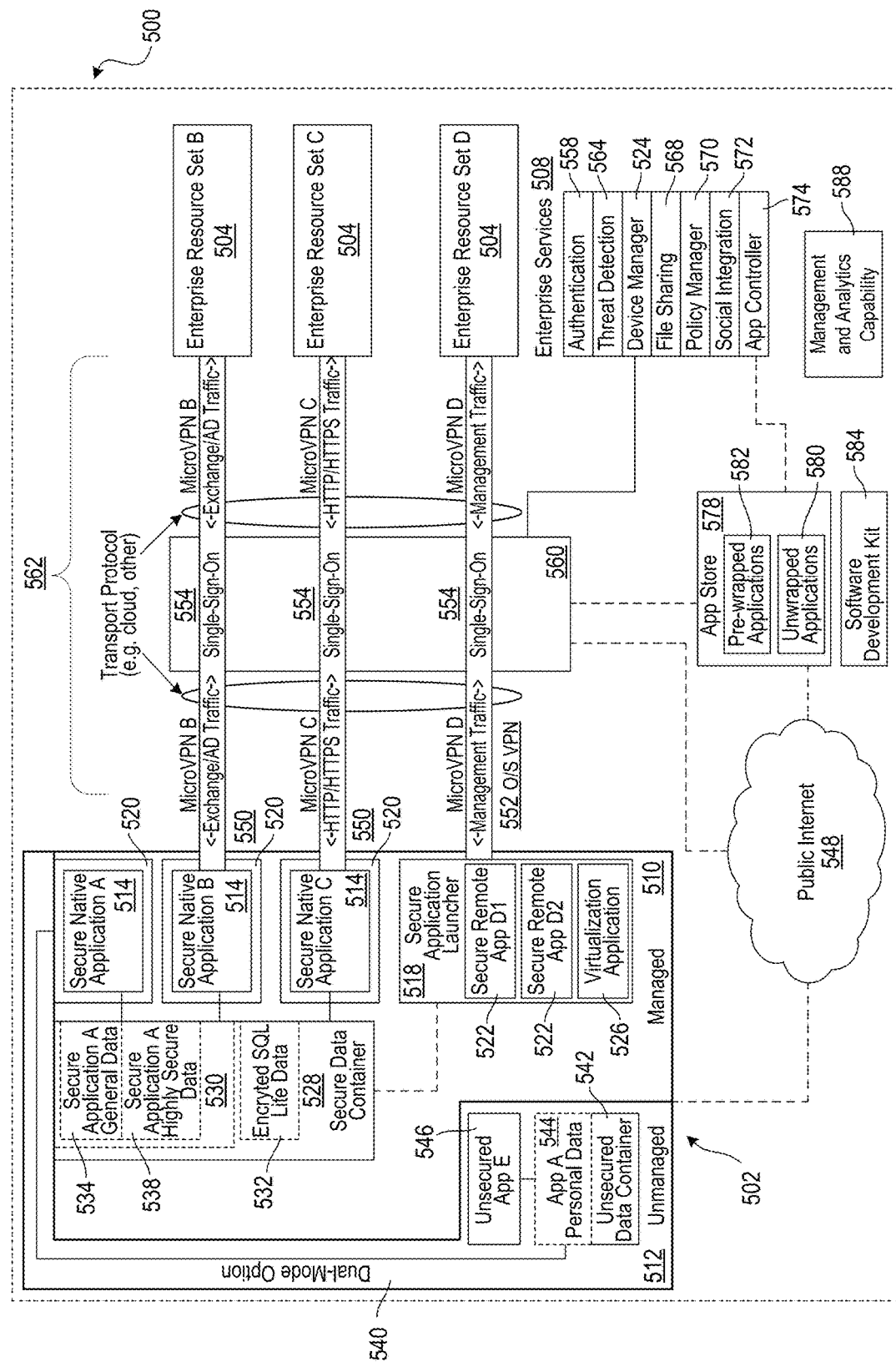
FIG. 5 depicts an illustrative enterprise mobility management system.

FIG. 5 represents an enterprise mobility technical architecture 500 for use in a "Bring Your Own Device" (BYOD) environment. The architecture enables a user of a mobile device 502 to both access enterprise or personal resources from a mobile device 502 and use the mobile device 502 for personal use. The user may access such enterprise resources 504 or enterprise services 508 using a mobile device 502 that is purchased by the user or a mobile device 502 that is provided by the enterprise to the user. The user may utilize the mobile device 502 for business use only or for business and personal use. The mobile device 502 may run an iOS operating system, an Android operating system, or the like. The enterprise may choose to implement policies to manage the mobile device 502. The policies may be implemented through a firewall or gateway in such a way that the mobile device 502 may be identified, secured or security verified, and provided selective or full access to the enterprise resources (e.g., 504 and 508.) The policies may be mobile device management policies, mobile application management policies, mobile data management policies, or some combination of mobile device, application, and data management policies. A mobile device 502 that is managed through the application of mobile device management policies may be referred to as an enrolled device.

In some embodiments, the operating system of the mobile device 502 may be separated into a managed partition 510 and an unmanaged partition 512. The managed partition 510 may have policies applied to it to secure the applications running on and data stored in the managed partition 510. The applications running on the managed partition 510 may be secure applications. In other embodiments, all applications may execute in accordance with a set of one or more policy files received separate from the application, and which define one or more security parameters, features, resource restrictions, and/or other access controls that are enforced by the mobile device management system when that application is executing on the mobile device 502. By operating in accordance with their respective policy file(s), each application may be allowed or restricted from communications with one or more other applications and/or resources, thereby creating a virtual partition. Thus, as used herein, a partition may refer to a physically partitioned portion of memory (physical partition), a logically partitioned portion of memory (logical partition), and/or a virtual partition created as a result of enforcement of one or more policies and/or policy files across multiple applications as described herein (virtual partition). Stated differently, by enforcing policies on managed applications, those applications may be restricted to only be able to communicate with other managed applications and trusted enterprise resources, thereby creating a virtual partition that is not accessible by unmanaged applications and devices.

The secure applications may be email applications, web browsing applications, software-as-a-service (SaaS) access applications, Windows Application access applications, and the like. The secure applications may be secure native applications 514, secure remote applications 522 executed by a secure application launcher 518, virtualization applications 526 executed by a secure application launcher 518, and the like. The secure native applications 514 may be wrapped by a secure application wrapper 520. The secure application wrapper 520 may include integrated policies that are executed on the mobile device 502 when the secure native application 514 is executed on the mobile device 502. The secure application wrapper 520 may include meta-data that points the secure native application 514 running on the mobile device 502 to the resources hosted at the enterprise (e.g., 504 and 508) that the secure native application 514 may require to complete the task requested upon execution of the secure native application 514. The secure remote applications 522 executed by a secure application launcher 518 may be executed within the secure application launcher 518. The virtualization applications 526 executed by a secure application launcher 518 may utilize resources on the mobile device 502, at the enterprise resources 504, and the like. The resources used on the mobile device 502 by the virtualization applications 526 executed by a secure application launcher 518 may include user interaction resources, processing resources, and the like. The user interaction resources may be used to collect and transmit keyboard input, mouse input, camera input, tactile input, audio input, visual input, gesture input, and the like. The processing resources may be used to present a user interface, process data received from the enterprise resources 504, and the like. The resources used at the enterprise resources 504 by the virtualization applications 526 executed by a secure application launcher 518 may include user interface generation resources, processing resources, and the like. The user interface generation resources may be used to assemble a user interface, modify a user interface, refresh a user interface, and the like. The processing resources may be used to create information, read information, update information, delete information, and the like. For example, the virtualization application 526 may record user interactions associated with a graphical user interface (GUI) and communicate them to a server application where the server application will use the user interaction data as an input to the application operating on the server. In such an arrangement, an enterprise may elect to maintain the application on the server side as well as data, files, etc. associated with the application. While an enterprise may elect to "mobilize" some applications in accordance with the principles herein by securing them for deployment on the mobile device 502, this arrangement may also be elected for certain applications. For example, while some applications may be secured for use on the mobile device 502, others might not be prepared or appropriate for deployment on the mobile device 502 so the enterprise may elect to provide the mobile user access to the unprepared applications through virtualization techniques. As another example, the enterprise may have large complex applications with large and complex data sets (e.g., material resource planning applications) where it would be very difficult, or otherwise undesirable, to customize the application for the mobile device 502 so the enterprise may elect to provide access to the application through virtualization techniques. As yet another example, the enterprise may have an application that maintains highly secured data (e.g., human resources data, customer data, engineering data) that may be deemed by the enterprise as too sensitive for even the secured mobile environment so the enterprise may elect to use virtualization techniques to permit mobile access to such applications and data. An enterprise may elect to provide both fully secured and fully functional applications on the mobile device 502 as well as a virtualization application 526 to allow access to applications that are deemed more properly operated on the server side. In an embodiment, the virtualization application 526 may store some data, files, etc. on the mobile device 502 in one of the secure storage locations. An enterprise, for example, may elect to allow certain information to be stored on the mobile device 502 while not permitting other information.

In connection with the virtualization application 526, as described herein, the mobile device 502 may have a virtualization application 526 that is designed to present GUIs and then record user interactions with the GUI. The virtualization application 526 may communicate the user interactions to the server side to be used by the server side application as user interactions with the application. In response, the application on the server side may transmit back to the mobile device 502 a new GUI. For example, the new GUI may be a static page, a dynamic page, an animation, or the like, thereby providing access to remotely located resources.

The secure applications 514 may access data stored in a secure data container 528 in the managed partition 510 of the mobile device 502. The data secured in the secure data container may be accessed by the secure native applications 514, secure remote applications 522 executed by a secure application launcher 518, virtualization applications 526 executed by a secure application launcher 518, and the like. The data stored in the secure data container 528 may include files, databases, and the like. The data stored in the secure data container 528 may include data restricted to a specific secure application 530, shared among secure applications 532, and the like. Data restricted to a secure application may include secure general data 534 and highly secure data 538. Secure general data may use a strong form of encryption such as Advanced Encryption Standard (AES) 128-bit encryption or the like, while highly secure data 538 may use a very strong form of encryption such as AES 256-bit encryption. Data stored in the secure data container 528 may be deleted from the mobile device 502 upon receipt of a command from the device manager 524. The secure applications (e.g., 514, 522, and 526) may have a dual-mode option 540. The dual mode option 540 may present the user with an option to operate the secured application in an unsecured or unmanaged mode. In an unsecured or unmanaged mode, the secure applications may access data stored in an unsecured data container 542 on the unmanaged partition 512 of the mobile device 502. The data stored in an unsecured data container may be personal data 544. The data stored in an unsecured data container 542 may also be accessed by unsecured applications 546 that are running on the unmanaged partition 512 of the mobile device 502. The data stored in an unsecured data container 542 may remain on the mobile device 502 when the data stored in the secure data container 528 is deleted from the mobile device 502. An enterprise may want to delete from the mobile device 502 selected or all data, files, and/or applications owned, licensed or controlled by the enterprise (enterprise data) while leaving or otherwise preserving personal data, files, and/or applications owned, licensed or controlled by the user (personal data). This operation may be referred to as a selective wipe. With the enterprise and personal data arranged in accordance to the aspects described herein, an enterprise may perform a selective wipe.

The mobile device 502 may connect to enterprise resources 504 and enterprise services 508 at an enterprise, to the public Internet 548, and the like. The mobile device 502 may connect to enterprise resources 504 and enterprise services 508 through virtual private network connections. The virtual private network connections, also referred to as microVPN or application-specific VPN, may be specific to particular applications (as illustrated by microVPNs 550, particular devices, particular secured areas on the mobile device (as illustrated by O/S VPN 552), and the like. For example, each of the wrapped applications in the secured area of the mobile device 502 may access enterprise resources through an application specific VPN such that access to the VPN would be granted based on attributes associated with the application, possibly in conjunction with user or device attribute information. The virtual private network connections may carry Microsoft Exchange traffic, Microsoft Active Directory traffic, HyperText Transfer Protocol (HTTP) traffic, HyperText Transfer Protocol Secure (HTTPS) traffic, application management traffic, and the like. The virtual private network connections may support and enable single-sign-on authentication processes 554. The single-sign-on processes may allow a user to provide a single set of authentication credentials, which are then verified by an authentication service 558. The authentication service 558 may then grant to the user access to multiple enterprise resources 504, without requiring the user to provide authentication credentials to each individual enterprise resource 504.

The virtual private network connections may be established and managed by an access gateway 560. The access gateway 560 may include performance enhancement features that manage, accelerate, and improve the delivery of enterprise resources 504 to the mobile device 502. The access gateway 560 may also re-route traffic from the mobile device 502 to the public Internet 548, enabling the mobile device 502 to access publicly available and unsecured applications that run on the public Internet 548. The mobile device 502 may connect to the access gateway via a transport network 562. The transport network 562 may use one or more transport protocols and may be a wired network, wireless network, cloud network, local area network, metropolitan area network, wide area network, public network, private network, and the like.

The enterprise resources 504 may include email servers, file sharing servers, SaaS applications, Web application servers, Windows application servers, and the like. Email servers may include Exchange servers, Lotus Notes servers, and the like. File sharing servers may include ShareFile servers, and the like. SaaS applications may include Salesforce, and the like. Windows application servers may include any application server that is built to provide applications that are intended to run on a local Windows operating system, and the like. The enterprise resources 504 may be premise-based resources, cloud-based resources, and the like. The enterprise resources 504 may be accessed by the mobile device 502 directly or through the access gateway 560. The enterprise resources 504 may be accessed by the mobile device 502 via the transport network 562.

The enterprise services 508 may include authentication services 558, threat detection services 564, device manager services 524, file sharing services 568, policy manager services 570, social integration services 572, application controller services 574, and the like. Authentication services 558 may include user authentication services, device authentication services, application authentication services, data authentication services, and the like. Authentication services 558 may use certificates. The certificates may be stored on the mobile device 502, by the enterprise resources 504, and the like. The certificates stored on the mobile device 502 may be stored in an encrypted location on the mobile device 502, the certificate may be temporarily stored on the mobile device 502 for use at the time of authentication, and the like. Threat detection services 564 may include intrusion detection services, unauthorized access attempt detection services, and the like. Unauthorized access attempt detection services may include unauthorized attempts to access devices, applications, data, and the like. Device management services 524 may include configuration, provisioning, security, support, monitoring, reporting, and decommissioning services. File sharing services 568 may include file management services, file storage services, file collaboration services, and the like. Policy manager services 570 may include device policy manager services, application policy manager services, data policy manager services, and the like. Social integration services 572 may include contact integration services, collaboration services, integration with social networks such as Facebook, Twitter, and LinkedIn, and the like. Application controller services 574 may include management services, provisioning services, deployment services, assignment services, revocation services, wrapping services, and the like.

The enterprise mobility technical architecture 500 may include an application store 578. The application store 578 may include unwrapped applications 580, pre-wrapped applications 582, and the like. Applications may be populated in the application store 578 from the application controller 574. The application store 578 may be accessed by the mobile device 502 through the access gateway 560, through the public Internet 548, or the like. The application store 578 may be provided with an intuitive and easy to use user interface.

A software development kit 584 may provide a user the capability to secure applications selected by the user by wrapping the application as described previously in this description. An application that has been wrapped using the software development kit 584 may then be made available to the mobile device 502 by populating it in the application store 578 using the application controller 574.

The enterprise mobility technical architecture 500 may include a management and analytics capability 588. The management and analytics capability 588 may provide information related to how resources are used, how often resources are used, and the like. Resources may include devices, applications, data, and the like. How resources are used may include which devices download which applications, which applications access which data, and the like. How often resources are used may include how often an application has been downloaded, how many times a specific set of data has been accessed by an application, and the like.

Figure 6:
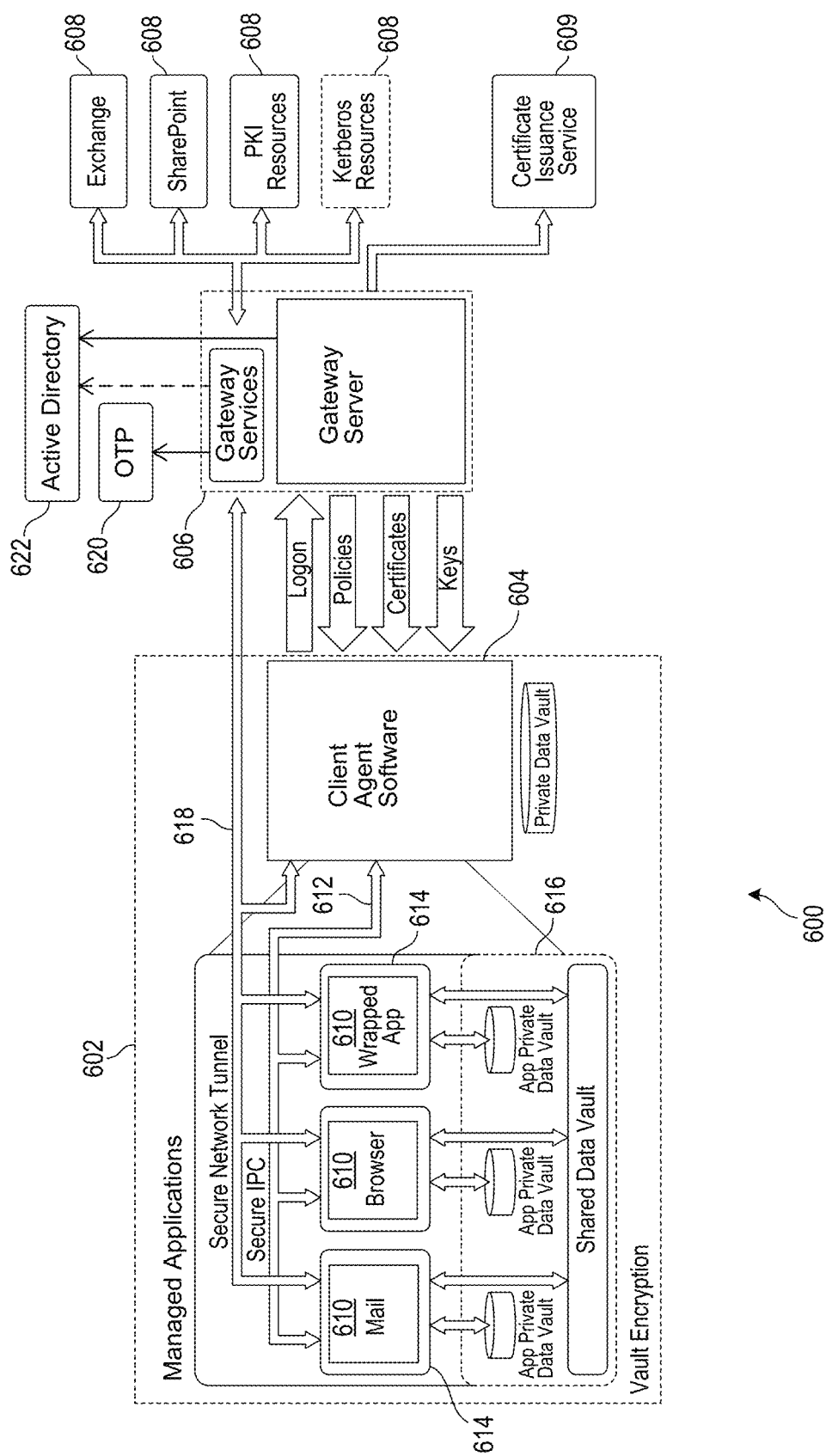
FIG. 6 depicts another illustrative enterprise mobility management system.

FIG. 6 is another illustrative enterprise mobility management system 600. Some of the components of the mobility management system 500 described above with reference to FIG. 5 have been omitted for the sake of simplicity. The architecture of the system 600 depicted in FIG. 6 is similar in many respects to the architecture of the system 500 described above with reference to FIG. 5 and may include additional features not mentioned above.

In this case, the left hand side represents an enrolled mobile device 602 with a client agent 604, which interacts with gateway server 606 (which includes Access Gateway and application controller functionality) to access various enterprise resources 608 and services 609 such as Exchange, Sharepoint, public-key infrastructure (PKI) Resources, Kerberos Resources, Certificate Issuance service, as shown on the right hand side above. Although not specifically shown, the mobile device 602 may also interact with an enterprise application store (StoreFront) for the selection and downloading of applications.

The client agent 604 acts as the UI (user interface) intermediary for Windows apps/desktops hosted in an Enterprise data center, which are accessed using the High-Definition User Experience (HDX)/ICA display remoting protocol. The client agent 604 also supports the installation and management of native applications on the mobile device 602, such as native iOS or Android applications. For example, the managed applications 610 (mail, browser, wrapped application) shown in the figure above are all native applications that execute locally on the mobile device 602. Client agent 604 and application management framework of this architecture act to provide policy driven management capabilities and features such as connectivity and SSO (single sign on) to enterprise resources/services 608. The client agent 604 handles primary user authentication to the enterprise, normally to Access Gateway (AG) 606 with SSO to other gateway server components. The client agent 604 obtains policies from gateway server 606 to control the behavior of the managed applications 610 on the mobile device 602.

The Secure InterProcess Communication (IPC) links 612 between the native applications 610 and client agent 604 represent a management channel, which may allow a client agent to supply policies to be enforced by the application management framework 614 "wrapping" each application. The IPC channel 612 may also allow client agent 604 to supply credential and authentication information that enables connectivity and SSO to enterprise resources 608. Finally, the IPC channel 612 may allow the application management framework 614 to invoke user interface functions implemented by client agent 604, such as online and offline authentication.

Communications between the client agent 604 and gateway server 606 are essentially an extension of the management channel from the application management framework 614 wrapping each native managed application 610. The application management framework 614 may request policy information from client agent 604, which in turn may request it from gateway server 606. The application management framework 614 may request authentication, and client agent 604 may log into the gateway services part of gateway server 606 (for example, Citrix Gateway). Client agent 604 may also call supporting services on gateway server 606, which may produce input material to derive encryption keys for the local data vaults 616, or may provide client certificates which may enable direct authentication to PKI protected resources, as more fully explained below.

In more detail, the application management framework 614 "wraps" each managed application 610. This may be incorporated via an explicit build step, or via a post-build processing step. The application management framework 614 may "pair" with client agent 604 on first launch of an application 610 to initialize the Secure IPC channel 612 and obtain the policy for that application. The application management framework 614 may enforce relevant portions of the policy that apply locally, such as the client agent login dependencies and some of the containment policies that restrict how local OS services may be used, or how they may interact with the managed application 610.

The application management framework 614 may use services provided by client agent 604 over the Secure IPC channel 612 to facilitate authentication and internal network access. Key management for the private and shared data vaults 616 (containers) may be also managed by appropriate interactions between the managed applications 610 and client agent 604. Vaults 616 may be available only after online authentication, or may be made available after offline authentication if allowed by policy. First use of vaults 616 may require online authentication, and offline access may be limited to at most the policy refresh period before online authentication is again required.

Network access to internal resources may occur directly from individual managed applications 610 through Access Gateway 606. The application management framework 614 may be responsible for orchestrating the network access on behalf of each managed application 610. Client agent 604 may facilitate these network connections by providing suitable time limited secondary credentials obtained following online authentication. Multiple modes of network connection may be used, such as reverse web proxy connections and end-to-end VPN-style tunnels 618.

The Mail and Browser managed applications 610 have special status and may make use of facilities that might not be generally available to arbitrary wrapped applications. For example, the Mail application 610 may use a special background network access mechanism that allows it to access an Exchange server 608 over an extended period of time without requiring a full AG logon. The Browser application 610 may use multiple private data vaults 616 to segregate different kinds of data.

This architecture may support the incorporation of various other security features. For example, gateway server 606 (including its gateway services) in some cases may not need to validate active directory (AD) passwords. It can be left to the discretion of an enterprise whether an AD password may be used as an authentication factor for some users in some situations. Different authentication methods may be used if a user is online or offline (i.e., connected or not connected to a network).

Step up authentication is a feature wherein gateway server 606 may identify managed native applications 610 that are allowed to have access to highly classified data requiring strong authentication, and ensure that access to these applications is only permitted after performing appropriate authentication, even if this means a re-authentication is required by the user after a prior weaker level of login.

Another security feature of this solution is the encryption of the data vaults 616 (containers) on the mobile device 602. The vaults 616 may be encrypted so that all on-device data including files, databases, and configurations are protected. For on-line vaults, the keys may be stored on the server (gateway server 606), and for off-line vaults, a local copy of the keys may be protected by a user password or biometric validation. If or when data is stored locally on the mobile device 602 in the secure container 616, it may be preferred that a minimum of AES 256 encryption algorithm be utilized.

Other secure container features may also be implemented. For example, a logging feature may be included, wherein security events happening inside a managed application 610 may be logged and reported to the backend. Data wiping may be supported, such as if or when the managed application 610 detects tampering, associated encryption keys may be written over with random data, leaving no hint on the file system that user data was destroyed. Screenshot protection may be another feature, where an application may prevent any data from being stored in screenshots. For example, the key window's hidden property may be set to YES. This may cause whatever content is currently displayed on the screen to be hidden, resulting in a blank screenshot where any content would normally reside.

Local data transfer may be prevented, such as by preventing any data from being locally transferred outside the application container, e.g., by copying it or sending it to an external application. A keyboard cache feature may operate to disable the autocorrect functionality for sensitive text fields. SSL certificate validation may be operable so the application specifically validates the server SSL certificate instead of it being stored in the keychain. An encryption key generation feature may be used such that the key used to encrypt data on the mobile device 602 is generated using a passphrase or biometric data supplied by the user (if offline access is required). It may be XORed with another key randomly generated and stored on the server side if offline access is not required. Key Derivation functions may operate such that keys generated from the user password use KDFs (key derivation functions, notably Password-Based Key Derivation Function 2 (PBKDF2)) rather than creating a cryptographic hash of it. The latter makes a key susceptible to brute force or dictionary attacks.

Further, one or more initialization vectors may be used in encryption methods. An initialization vector will cause multiple copies of the same encrypted data to yield different cipher text output, preventing both replay and cryptanalytic attacks. This will also prevent an attacker from decrypting any data even with a stolen encryption key. Further, authentication then decryption may be used, wherein application data is decrypted only after the user has authenticated within the application. Another feature may relate to sensitive data in memory, which may be kept in memory (and not in disk) only when it's needed. For example, login credentials may be wiped from memory after login, and encryption keys and other data inside objective-C instance variables are not stored, as they may be easily referenced. Instead, memory may be manually allocated for these.

An inactivity timeout may be implemented, wherein after a policy-defined period of inactivity, a user session is terminated.

Data leakage from the application management framework 614 may be prevented in other ways. For example, if or when a managed application 610 is put in the background, the memory may be cleared after a predetermined (configurable) time period. When backgrounded, a snapshot may be taken of the last displayed screen of the application to fasten the foregrounding process. The screenshot may contain confidential data and hence should be cleared.

Another security feature may relate to the use of an OTP (one time password) 620 without the use of an AD (active directory) 622 password for access to one or more applications. In some cases, some users do not know (or are not permitted to know) their AD password, so these users may authenticate using an OTP 620 such as by using a hardware OTP system like SecurID (OTPs may be provided by different vendors also, such as Entrust or Gemalto). In some cases, after a user authenticates with a user ID, a text may be sent to the user with an OTP 620. In some cases, this may be implemented only for online use, with a prompt being a single field.

An offline password may be implemented for offline authentication for those managed applications 610 for which offline use is permitted via enterprise policy. For example, an enterprise may want StoreFront to be accessed in this manner In this case, the client agent 604 may require the user to set a custom offline password and the AD password is not used. Gateway server 606 may provide policies to control and enforce password standards with respect to the minimum length, character class composition, and age of passwords, such as described by the standard Windows Server password complexity requirements, although these requirements may be modified.

Another feature may relate to the enablement of a client side certificate for certain applications 610 as secondary credentials (for the purpose of accessing PKI protected web resources via the application management framework micro VPN feature). For example, a managed application 610 may utilize such a certificate. In this case, certificate-based authentication using ActiveSync protocol may be supported, wherein a certificate from the client agent 604 may be retrieved by gateway server 606 and used in a keychain. Each managed application 610 may have one associated client certificate, identified by a label that is defined in gateway server 606.

Gateway server 606 may interact with an enterprise special purpose web service to support the issuance of client certificates to allow relevant managed applications to authenticate to internal PKI protected resources.

The client agent 604 and the application management framework 614 may be enhanced to support obtaining and using client certificates for authentication to internal PM protected network resources. More than one certificate may be supported, such as to match various levels of security and/or separation requirements. The certificates may be used by the Mail and Browser managed applications 610, and ultimately by arbitrary wrapped applications 610 (provided those applications use web service style communication patterns where it is reasonable for the application management framework to mediate HTTPS requests).

Application management client certificate support on iOS may rely on importing a public-key cryptography standards (PKCS) 12 BLOB (Binary Large Object) into the iOS keychain in each managed application 610 for each period of use. Application management framework client certificate support may use a HTTPS implementation with private in-memory key storage. The client certificate may not be present in the iOS keychain and may not be persisted except potentially in "online-only" data value that is strongly protected.

Mutual SSL or TLS may also be implemented to provide additional security by requiring that a mobile device 602 is authenticated to the enterprise, and vice versa. Virtual smart cards for authentication to gateway server 606 may also be implemented.

Another feature may relate to application container locking and wiping, which may automatically occur upon jailbreak or rooting detections, and occur as a pushed command from administration console, and may include a remote wipe functionality even when a managed application 610 is not running.

A multi-site architecture or configuration of enterprise application store and an application controller may be supported that allows users to be serviced from one of several different locations in case of failure.

In some cases, managed applications 610 may be allowed to access a certificate and private key via an API (for example, OpenSSL). Trusted managed applications 610 of an enterprise may be allowed to perform specific Public Key operations with an application's client certificate and private key. Various use cases may be identified and treated accordingly, such as if or when an application behaves like a browser and no certificate access is required, if or when an application reads a certificate for "who am I," if or when an application uses the certificate to build a secure session token, and if or when an application uses private keys for digital signing of important data (e.g. transaction log) or for temporary data encryption.

Systems and Methods for Expedited Access to Applications

Figure 7:
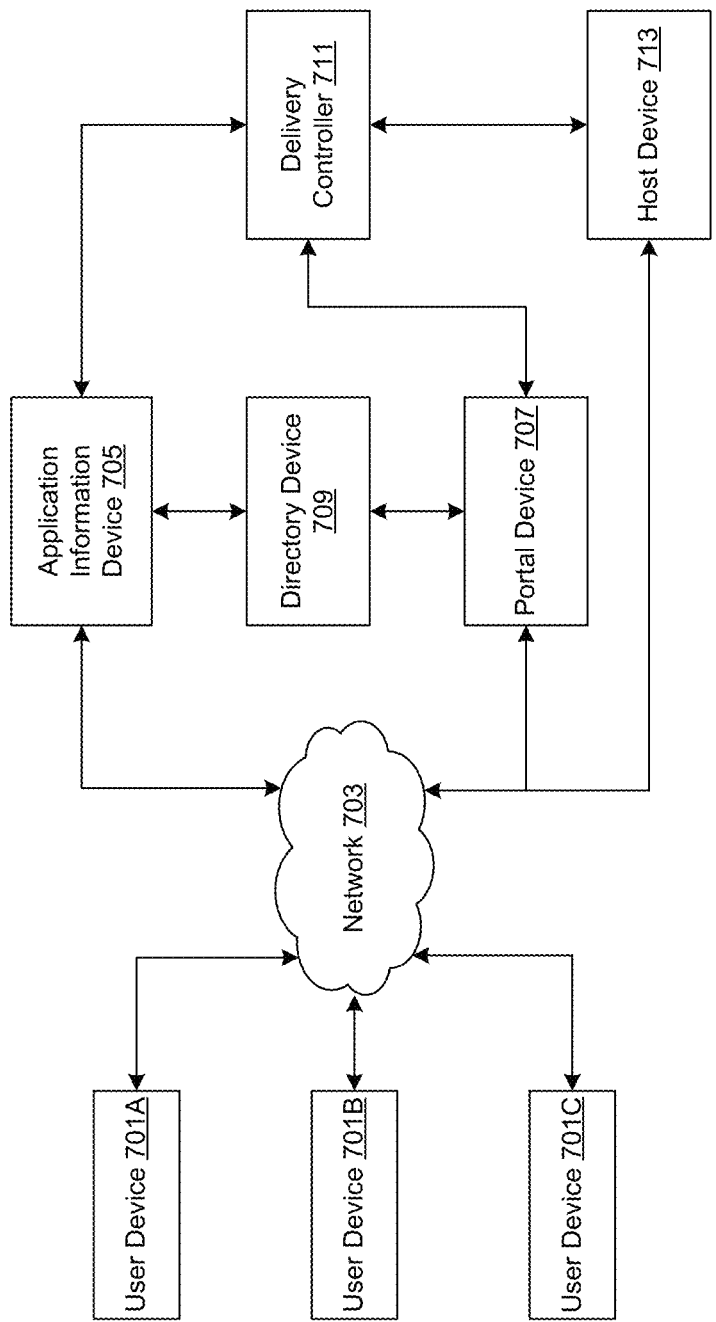
FIG. 7 is a schematic diagram showing an example system providing expedited access to applications.

FIG. 7 is a schematic diagram showing an example system providing expedited access to applications. The system may comprise one or more user or client devices (e.g., user devices 701A-701C), one or more networks (e.g., network 703), one or more application information devices (e.g., application information device 705), one or more portal devices (e.g., portal device 707), one or more directory devices (e.g., directory device 709), one or more delivery controllers (e.g., delivery controller 711), and one or more host devices (e.g., host device 713). In some examples, one or more of the devices in the system (and/or the functionalities thereof) may be implemented in a single computing device, as desired by a person of ordinary skill in the art.

A user device of the user devices 701A-701C may comprise, for example, a smartphone, a personal computer, a tablet, a desktop computer, a laptop computer, a gaming device, a virtual reality headset, or any other computing device. Additionally or alternatively, a user device of the user devices 701A-701C may comprise, for example, the computers 107, 109, the terminals 240, the client computers 411-414, the mobile device 502, or the mobile device 602 as discussed above in connection with FIGS. 1-2 and 4-6.

The network 703 may comprise one or more of any of various types of information distribution networks, such as, without limitation, a satellite network, a telephone network, a cellular network, a Wi-Fi network, an Ethernet network, an optical fiber network, a coaxial cable network, a hybrid fiber coax network, and/or the like. The network 703 may comprise an Internet Protocol (IP) based network (e.g., the Internet) or other types of networks. The network 703 may comprise, for example, the wide area network 101, the local area network 133, or the computer network 230. The network 703 may comprise one or more communication links configured to connect one or more computing devices, such as the user devices 701A-701C, the application information device 705, the portal device 707, and/or the host device 713.

The portal device 707, the directory device 709, the delivery controller 711, and/or the host device 713 may be configured to provide, to the user devices 701A-701C, various types of services, such as virtual desktops, virtual applications, web applications, and/or the like. For example, the devices 707, 709, 711, and/or 713 together may implement an application virtualization platform, providing virtual applications to the user devices 701A-701C for instant access by various users. The user devices 701A-701C may be used by users to access the provided virtual applications. In some examples, the devices 707, 709, 711, and/or 713 may provide the services to an enterprise organization comprising a number of users, such as a company, a school, an agency, and/or the like.

The portal device 707 may comprise, for example, a computing device configured to present, to the user devices 701A-701C, the front end of the application virtualization platform. For example, the portal device 707 may present, to the user device 701A, a login interface of the application virtualization platform. A user may input, to the portal device 707 and via the login interface displayed by the user device 701A, the user's authentication credentials (such as usernames, passwords, and/or the like). In some examples, the portal device 707 may present, to the user device 701A, a plurality of applications for the user's selection via a user interface. The user may indicate, to the portal device 707 and via the user device 701A, an application as selected by the user for access. The portal device 707 may connect to the directory device 709 and/or the delivery controller 711 to perform various functions, such as authenticating the user, obtaining application information indicating a plurality of applications for a user's selection, and/or implementing the selected application.

The directory device 709 may comprise, for example, a computing device configured to implement a directory service (e.g., Active Directory services). The directory device 709 may, for example, store one or more user hierarchies associated with an enterprise organization. The user hierarchies may be organized in a tree structure, a forest structure, and/or the like, and may resemble the enterprise organization's structure (e.g., managerial structure, geographical structure, etc.). The directory device 709 may additionally or alternatively store information for authenticating the users in the user hierarchies (e.g., usernames and/or passwords). The portal device 707 may, in connection with the directory device 709, authenticate a user based on his or her input authentication credentials.

The delivery controller 711 may comprise, for example, a computing device configured to manage access to virtual applications of the application virtualization platform or web applications (e.g., Software As A Service (SAAS) applications) or other hosted applications. The delivery controller 711 may store data indicating a plurality of applications accessible by a user of the application virtualization platform, and may distribute a user request to access an application to host devices (e.g., the host device 713) for implementing and/or hosting the application. For example, after the portal device 707 authenticates a user, the portal device 707 may request, from the delivery controller 711, a plurality of applications (e.g., application list(s)) that the user is allowed to access, for presenting to the user device of the user. In some examples, after the portal device 707 receives a request to access an application selected by the user, the portal device 707 may send the request to the delivery controller 711. The delivery controller 711 may distribute the request to a host device (e.g., the host device 713) for hosting the requested application.

The host device 713 may be configured to host various services and/or to deliver the services to user devices. The host device 713 may comprise, for example, a physical computing device (e.g., the data server 103, the web server 105, the server 206, etc.). Additionally or alternatively, the host device 713 may comprise a virtual machine. For example, the host device 713 may comprise one of the virtual machines 332A-332C implemented on the virtualization server 301. The host device 713 may be configured to host various services, such as virtual desktops, virtual applications, web applications, and/or the like, and to deliver the services to the user devices 701A-701C. For example, with application virtualization, execution and/or processing of the virtual applications may take place on the host device 713, and the display of the virtual applications may be delivered to the user devices 701A-701C. For example, after the host device 713 receives, from the delivery controller 711, the request to access an application, the host device 713 may implement the application, and may deliver the display of the application to a corresponding user device (e.g., via the delivery controller 711 and/or the portal device 707, or directly via the network 703 and bypassing the delivery controller 711 and/or the portal device 707).

The application information device 705 may comprise, for example, a computing device configured to determine application information for users (e.g., customized application information). As described in greater detail below, the application information device 705 may receive, from the user device 701A-701C, data indicating the application usage behavior of the users associated with the user devices 701A-701C, and/or may receive, from the directory device 709, data indicating user hierarchies of the users. The application information device 705 may determine, based on the received data, the customized application information for the users. The application information device 705 may send, to the delivery controller 711 and/or other computing devices, the customized application information for generating user interfaces for presenting to the users and thereby expediting access to applications. For example, application information for (e.g., customized to) a target user may be delivered to a user device associated with the target user, and may be used to generate a user interface on the user device showing identifiers of applications indicated in the application information for the target user's selection, so that the target user may have expedited access to interested applications. In some examples, the target user may select, via an input device and from the user interface presented to him or her, an interested application. The selection of the application may cause the user device and/or associated computing device(s) to launch the selected application.

Application information (e.g., listings of applications, sets of applications, etc., customized to a particular user) may be determined, for example, based on the user's application usage behavior and/or other users' application usage behavior. The application information may indicate, for example, first applications that are regularly used by the user and/or second applications that are rarely used by the user but are regularly used by users having similar application usage patterns as the user. Including the first applications in the customized application information may facilitate the user's identification and/or activation of an application that the user intends to access. Including the second applications in the application information may help introduce new applications of potential interest to the user, as these applications are regularly used by other similar users. Determining application information may help increase user convenience in accessing applications (e.g., reduce the time in which to launch recommended applications). The application information may be determined and/or updated dynamically (e.g., periodically) to adapt to changing user behavior. The application information may be delivered to a user device associated with the target user, and may be used to generate a user interface on the user device (e.g., showing listings of interested applications), so that the user may have expedited access to interested applications in a timely fashion.

Figure 8:
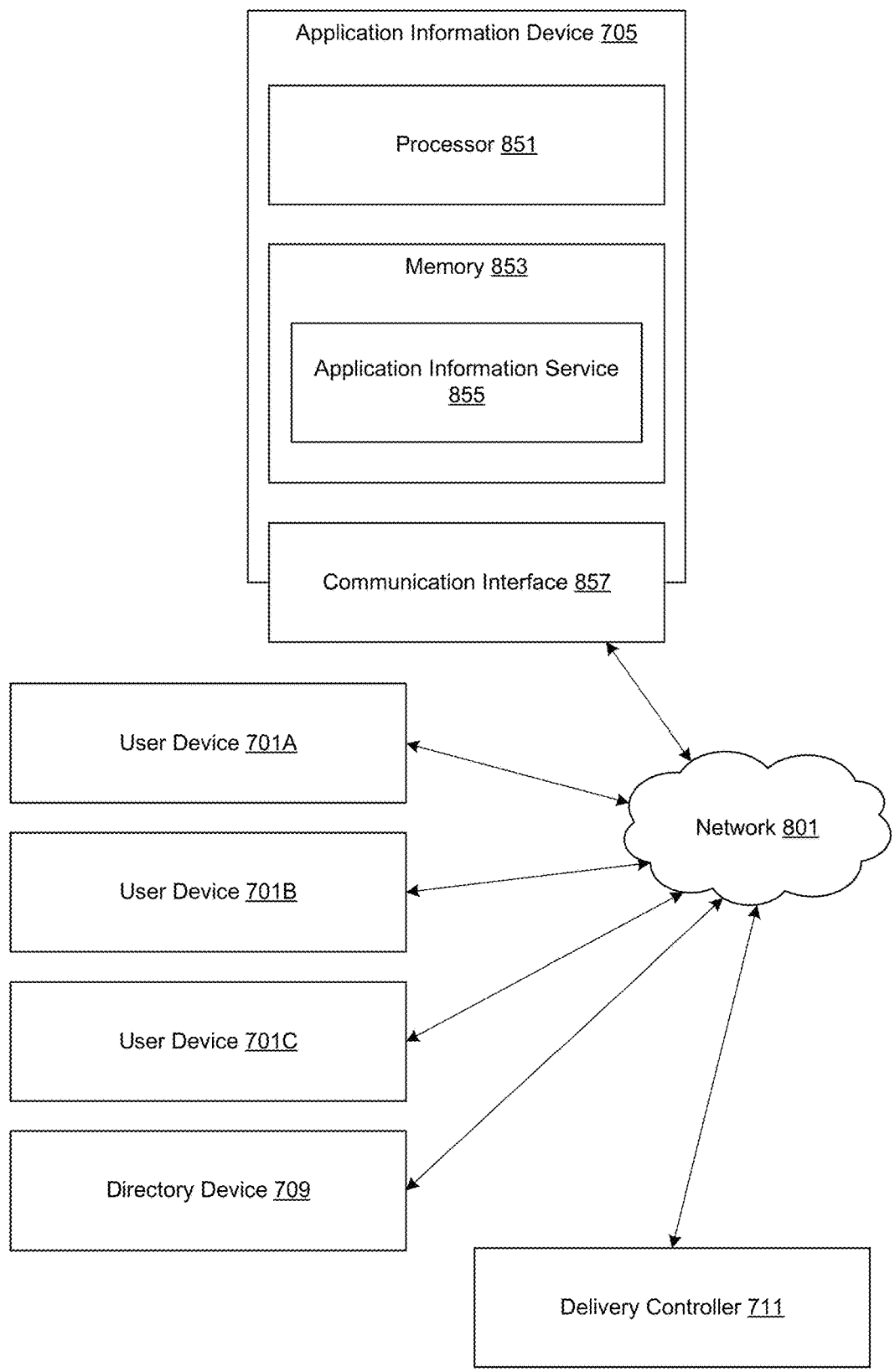
FIG. 8 is a schematic diagram showing an example system for determining information of applications for generating user interfaces for expedited access.

FIG. 8 is a schematic diagram showing an example system for determining information of applications for generating user interfaces for expedited access. The system may comprise, for example, a network 801, the application information device 705, the user devices 701A-701C, the directory device 709, and/or the delivery controller 711. The application information device 705, the user devices 701A-701C, the directory device 709, and/or the delivery controller 711 may comprise one or more physical components, such as one or more processors, memory, one or more communication interfaces, and/or the like. The memory may store instructions that, when executed by the one or more processors, cause performance of the functions described herein.

In some examples, a user device of the user devices 701A-701C may include, incorporate, and/or implement one or more aspects of the client devices, mobile devices, and/or user devices discussed above. In some examples, the directory device 709 and/or the delivery controller 711 may include, incorporate, and/or implement one or more aspects of the enterprise systems and/or management servers discussed above. Additionally or alternatively, the directory device 709 and/or the delivery controller 711 may include, incorporate, and/or implement one or more aspects of the virtualization servers and/or other virtualization infrastructure discussed above and/or may communicate with one or more enterprise systems that include, incorporate, and/or implement one or more aspects of the virtualization servers and/or other virtualization infrastructure discussed above. The directory device 709 may comprise a computing device that provides one or more directory services (e.g., Active Directory services). The delivery controller 711 may comprise a computing device that stores application information to be presented to users (e.g., a general application list comprising all of the applications that a user is allowed to access, a customized application list comprising applications regularly used by the user and/or by other similar user(s), etc.). The application information device 705 may comprise a computing device that determines application information (e.g., lists) based on application usage data received from the user devices 701A-701C, the directory service data received from the directory device 709, and/or other types of data. The network 801 may comprise one or more local area networks, wide area networks, public networks, private networks, and/or sub-networks, and may interconnect the application information device 705, the user devices 701A-701C, the directory device 709, and/or the delivery controller 711. In some examples, one or more of the application information device 705, the directory device 709, and/or the delivery controller 711, or functionalities thereof, may be incorporated in a single computing device.

The application information device 705 may comprise at least one processor 851, memory 853, and at least one communication interface 857. The processor 851 may execute instructions stored in the memory 853 that cause the application information device 705 to perform one or more functions, such as determining customized application information (e.g., lists) and/or performing other functions, as described in greater detail below in connection with the algorithm(s) of FIGS. 9-13. The memory 853 may store an application information service 855, which may comprise instructions that enable the application information device 705 to provide one or more of these functions and/or other functions described below. The communication interface 857 may comprise one or more network interfaces via which the application information device 705 may communicate with one or more other systems and/or devices, such as the user devices 701A-701C, the directory device 709, and/or the delivery controller 711.

Figure 9:
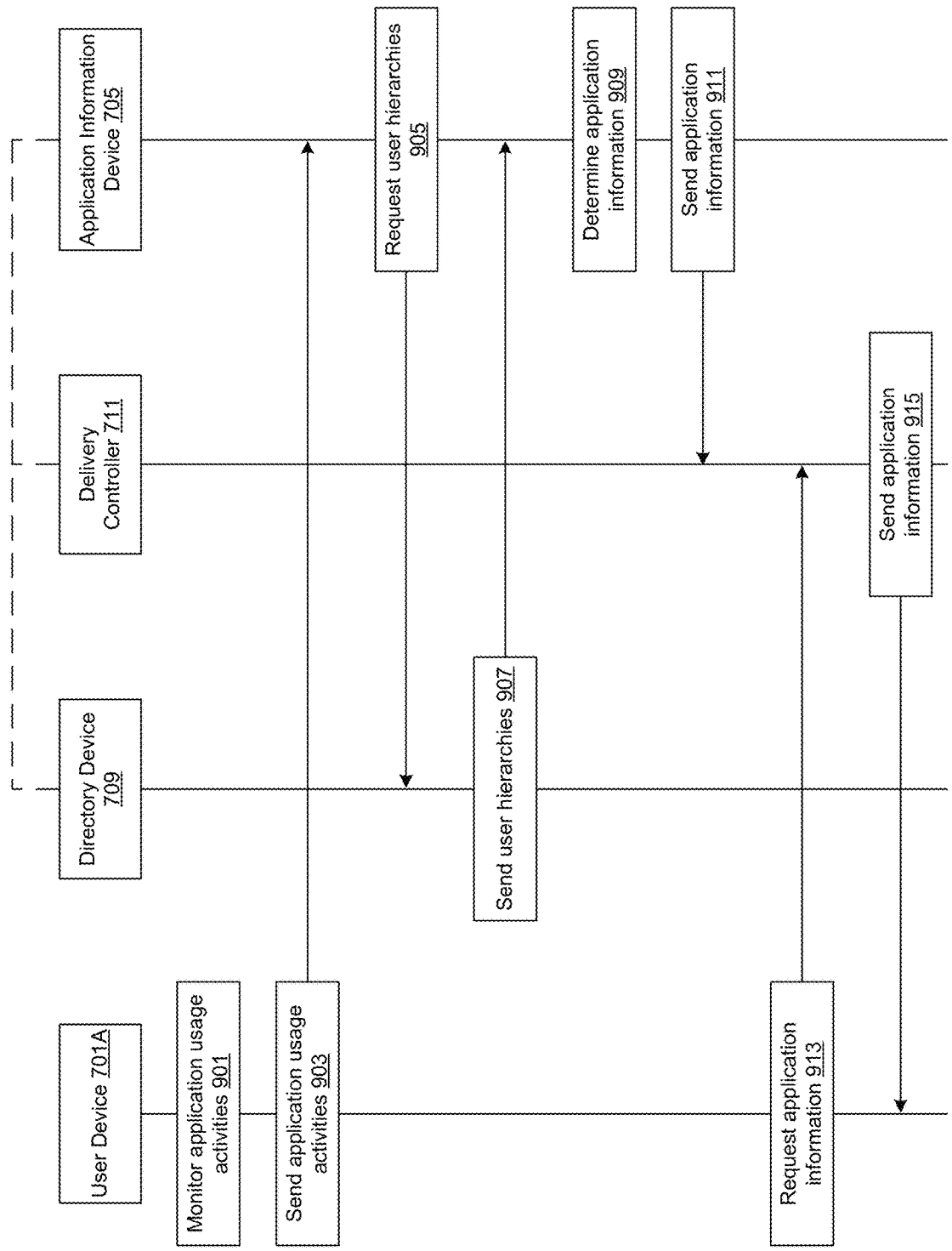
FIG. 9 is an event sequence showing an example method related to expedited access to applications.

FIG. 9 is an event sequence showing an example method related to expedited access to applications. While the steps of the event sequence are described in a particular order, the order of the steps may be altered without departing from the scope of the disclosure provided herein. Although the event sequence is described as being performed by a particular arrangement of computing systems, devices, and/or networks (e.g., the user device 701A, the directory device 709, the delivery controller 711, and/or the application information device 705), the processes may be performed by a greater or smaller number of computing systems, devices, and/or networks, and/or by any type of computing system, device, and/or network. In some examples, the directory device 709, the delivery controller 711, and the application information device 705 (and/or functionalities thereof) may be implemented on a single computing device (e.g., a single server).

In step 901, the user device 701A may monitor application usage activities associated with a user of the user device 701A. The user device 701A may output or display one or more applications to the user. The applications may be output, for example, via one or more windows and/or other user interfaces displayed on the user device 701A. The user device 701A may monitor application usage events in which an application is output via an active window displayed on the user device 701A (e.g., a window displayed at the top level of multiple overlapping windows, a currently focused window in the current window manager, etc.). For individual application usage events, the user device 701A may determine and/or store an identifier of the application of the application usage event, a time length of the application usage event, an identifier of the user using the application during the time length, and/or an identifier of the user device 701A. Additionally or alternatively, for individual application usage events, the user device 701A may determine and/or store an identifier of the enterprise organization in which the user is a member, an identifier of a user group or organization unit, within the enterprise organization, in which the user is a member, an identifier of an application store via which the application is output, an identifier of a server or host device via or on which the application is implemented (e.g., an IP address of the server or host device), and/or the like.

In some examples, the user device 701A may additionally or alternatively monitor other application usage activities. For example, the user device 701A may record an application usage event in which a cursor of the user device 701A hovers over an application output via a non-active window and causes an scroll-up or scroll-down action on the application. In some examples, the user device 701A may record an application usage event in which an application is output via a non-active window that overlaps with the active window to an extent less than a threshold or does not overlap with the active window. The user device 701A may monitor and/or record other types of application usage events. The user device 701A may assign, to the different types of application usage events, various weights that reflect the users various levels of usage with respect to the applications. And the assigned weights may be stored together with the recorded application usage events. The weights may be considered, for example, by the application information device 705 to account for different types of application usage, such as described in greater detail below in connection with FIG. 11 (e.g., step 1111). A weighted score corresponding to the time length of the application usage event multiplied by the weight assigned to the application usage event may be used, for example, by the application information device 705 for determining the usage of the applications.

In step 903, the user device 701A may send, to the application information device 705, the application usage activities as monitored in step 901. For example, the user device 701A may send, to the application information device 705, one or more application usage events as recorded by the user device 701A. For example, the user device 701A may store the recorded application usage events in a local cache and/or other memory of the user device 701A. The sending of the application usage events may be conducted periodically (e.g., every 24 hours, every 48 hours, etc.). After the sending of the application usage events, the user device 701A may, for example, delete the corresponding records in the local cache or memory. Additionally or alternatively, the monitoring of the application usage activities as described in connection with step 901 and/or the sending of the application usage activities as described in connection with step 903 may be performed by additional or alternative user devices, such as the user devices 701B-701C. The application information device 705 may receive, from a plurality of user devices, data of the application usage activities of the user devices, and may use the data to determine customized application information (e.g., lists).

In step 905, the application information device 705 may send, to the directory device 709, a request for user hierarchies. The requested user hierarchies may, for example, comprise arrangements of users according to relative inclusiveness. For example, the requested user hierarchies may be associated with an enterprise organization, and may indicate one or more user groups based on the enterprise organization's managerial structure, geographical distribution, and/or the like. The directory device 709 may receive the request for the user hierarchies. In step 907, the directory device 709 may send, to the application information device 705, the requested user hierarchies. The application information device 705 may receive the requested user hierarchies, and may determine, based on the user hierarchies, customized application information (e.g., customized application lists). In some examples, directory device 709 may send, to the application information device 705, other types of information that the application information device 705 may use to determine application information.

In step 909, the application information device 705 may determine application information (e.g., customized application lists). The application information may be determined, for example, based on application usage activity data received from one or more user devices (e.g., the user device 701A) and/or based on user hierarchy data received from the directory device 709. More details regarding determining application information are described below in connection with FIGS. 10-13. In step 911, the application information device 705 may send, to the delivery controller 711, the customized application information as determined in step 909. The delivery controller 711 may receive the application information, and may store the application information for retrieval by or presenting to user devices (e.g., the user device 701A). In some examples, steps 903, 909, 911 may be performed periodically (e.g., every 24 hours, every 48 hours, etc.) so that the application information may be periodically updated based on users' recent application usage patterns.

In step 913, the user device 701A may send, to the delivery controller 711, a request for application information (e.g., application lists). For example, such a request may be sent after a user logs into an associated application virtualization platform via the user device 701A. The user device 701A may, for example, request for a general application list comprising all of the applications that the user is allowed to access (e.g., all of the applications that the enterprise organization of which the user is a member subscribes to), application list(s) customized to the user (e.g., as determined by the application information device 705 in step 909), and/or other types of application information. In step 915, the delivery controller 711 may send, to the user device 701A, the requested application information. The user device 701A may receive the application information, and may display the application information to the user (e.g., by displaying the applications indicated in the application information as icons for the user's selection and access) and thereby enable expedited access to the applications (e.g., reduce the time to launch the applications). In some examples, if the user device 701A receives multiple application lists (e.g., a general application list and a customized application list), the user device 701A may separately present the multiple application lists (e.g., using multiple tabbed interfaces within a window). For example, the user device 701A may display, on a user interface of the user device 701A, the application information for (e.g., customized to) the user associated with the user device 701A as determined by the application information device 705. The user device 701A may display the application information in various manners. For example, applications indicated in the application information may be presented as icons, textual identifiers, buttons, toggles, etc., the selection of which (e.g., by the user via an input device) may cause the user device 701A and/or associated computing device(s) (e.g., an application virtualization platform) to implement the selected application and to present the implemented application to the user.

Figure 10:
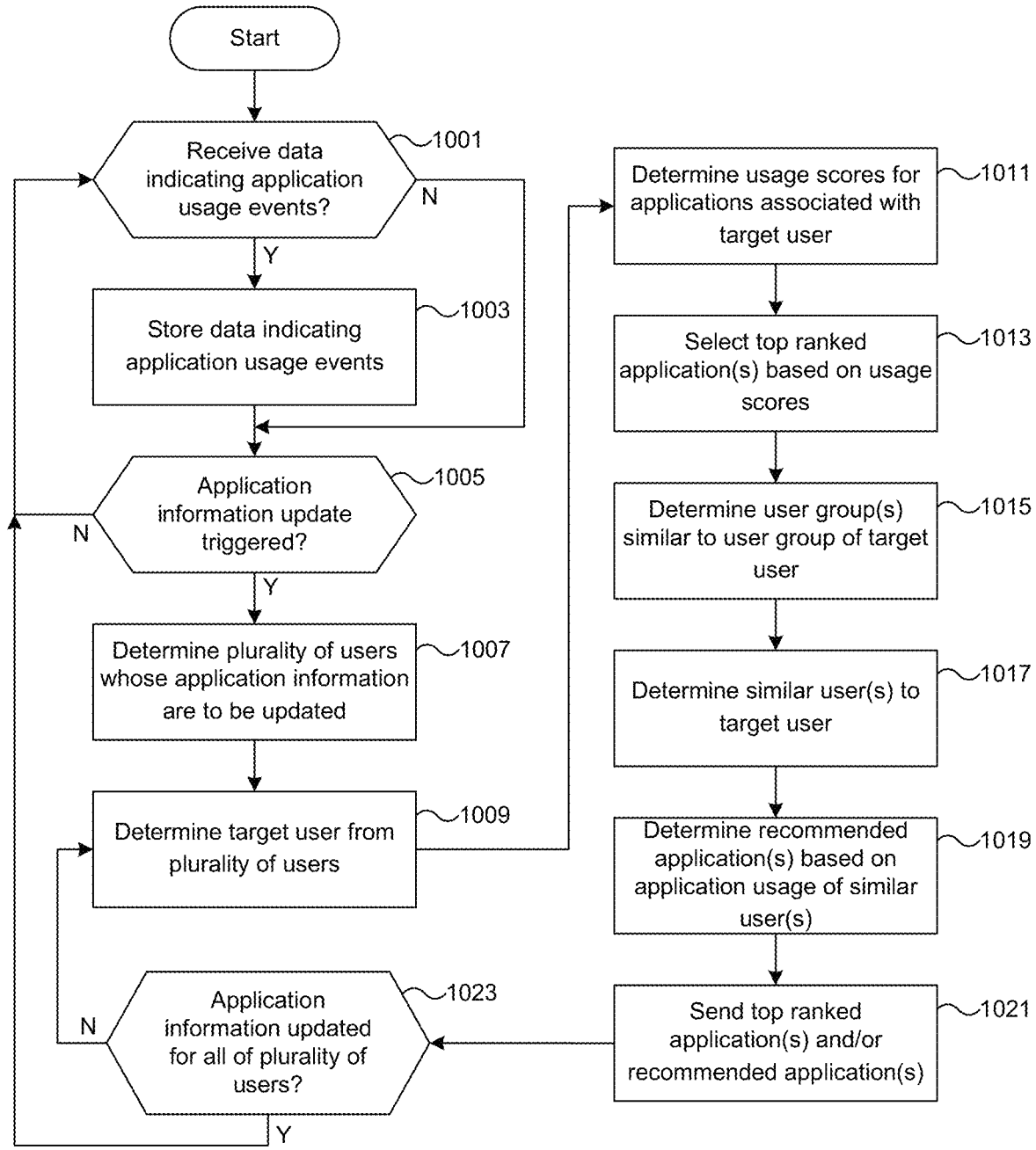
FIG. 10 is a flowchart showing an example method for determining application information for generating user interfaces for expedited access.

FIG. 10 is a flowchart showing an example method for determining application information for generating user interfaces for expedited access. The method may be performed, for example, by the system as described in connection with FIGS. 7-8. The steps of the method are described as being performed by particular component(s) and/or computing device(s) for the sake of simplicity, but the steps of the method may be performed by any other component(s) and/or computing device(s). The steps of the method may be performed by a single computing device or by multiple computing devices. One or more steps of the method may be omitted, added, and/or rearranged as desired by a person of ordinary skill in the art.

In step 1001, a computing device (e.g., the application information device 705) may determine whether the computing device receives data indicating application usage events (e.g., as described in connection with steps 901, 903). Data indicating application usage events may be received, for example, from one or more user devices (e.g., the user devices 701A-701C). For example, the user device 701A may continuously monitor application usage events that occur on the user device 701A, and may send the monitored application usage events to the computing device. If the computing device receives data indicating application usage events (step 1001: Y), the method may proceed to step 1003. If the computing device does not receive data indicating application usage events (step 1001: N), the method may proceed to step 1005.

In step 1003, the computing device may store the data indicating application usage events as received in step 1001. For example, the data may be stored in a database or memory of the computing device. Individual application usage events may indicate, for example, an identifier of the application of the application usage event, a time length of the application usage event, an identifier of the user using the application during the time length, an identifier of the user device that recorded the application usage event, an application usage type (e.g., application usage via an active window, application usage via a non-active but fully or partially displaying window, etc.), and/or other types of information. In some examples, the computing device may exclude certain types of received data (e.g., noisy data). For example, the computing device might not store received data that indicate an application usage event with a time length less than the threshold time length (e.g., 0.5 seconds). In some examples, the computing device might not store data that indicate an application usage event occurred during weekends, holidays, or personal vacations.

In step 1005, the computing device may determine whether an application information update is triggered. The application information update may be triggered periodically (e.g., every 24 hours, every 48 hours, every day during working days, etc.). For example, an enterprise organization may set a frequency for updating application information for its member users to every 24 hours. In some examples, different frequencies may be used for updating application information for different user groups within the enterprise organization. The different frequencies may be set based on preferences of the user groups and/or the user groups' tendencies to change application usage patterns. The application information update is triggered, for example, when a period (e.g., 24 hours, 48 hours, etc.) corresponding to the updating frequency is reached. As described in greater detail below, application information and underlying parameters used in the determination of the application information may be updated, for example, based on application usage event data received during the last calculation period (e.g., the period leading to the customized application information update). In some examples, the computing device might not trigger the application information update during weekends, holidays, non-working days, etc., in order to mitigate the system bias variance. The dynamic (e.g., periodic) updating of application information may allow the computing device to take into consideration changing user behaviors and/or user application usage patterns. If an application information update is triggered (step 1005: Y), the method may proceed to step 1007. If an application information update is not triggered (step 1005: N), the method may repeat step 1001.

In step 1007, the computing device may determine a plurality of users whose application information is to be updated. The plurality of users may comprise, for example, some or all of the member users of an enterprise organization. In some examples, the plurality of users may comprise, for example, member users of a particular user group within the enterprise organization (e.g., if different frequencies are set for different user groups within the enterprise organization and the period corresponding to the updating frequency for the particular user group is reached). In some examples, the plurality of users may comprise additional or alternative users (e.g., users inside or outside the enterprise organization).

In step 1009, the computing device may determine a target user from the plurality of users as determined in step 1007. For example, the computing device may sequentially select, from the plurality of users, a user as the target user. As described below in connection with steps 1011, 1013, 1015, 1017, 1019, 1021, the computing device may then update the application information (e.g., customized application list) for the target user, based on application usage event data as received in step 1001 and/or user hierarchy data as described in connection with steps 905, 907. In step 1023, the computing device may determine whether application information has been updated for all of the plurality of users as determined in step 1007. If application information has been updated for all of the plurality of users (step 1023: Y), the method may repeat step 1001. If customized application information has not been updated for all of the plurality of users (step 1023: N), the method may repeat step 1009. For example, the computing device may select, from the plurality of users, a next user as the target user for processing.

In step 1011, the computing device may determine usage scores for applications associated with the target user. For example, the computing device may determine a usage score for each of the applications that the target user is allowed to access. The usage scores may be determined, for example, based on application usage events associated with the target user (e.g., application usage events indicating that the target user used one or more applications during one or more time periods). In some examples, the computing device may obtain application usage event data associated with the target user that were received during the last calculation period (e.g., the last 24 hours leading to the customized application information update), and may determine updated usage scores based on the obtained application usage event data and the previously determined usage scores. In some examples, the computing device may store application usage event data associated with the target user that were received during a number of most recent calculation periods (e.g., the last 20 24-hour periods), and may determine updated usage scores based on the stored application usage event data. As an example, a usage score for an application of the target user may be calculated according to the following equation(s):

$$Y_n = \alpha Y_{n-1} + (1-\alpha)X_n \quad (1)$$

$$\alpha = \min\left\{q, \frac{1+C}{\beta+C}\right\} \quad (2)$$

$$\beta = \frac{1+T}{q} - T \quad (3)$$

In the equations (1), (2), and (3), n may represent the operation time index in sequence starting from 1 (e.g., the number of calculation periods since the computing device started to perform the process for updating application information), $Y_n$ may represent the nth usage score for a particular application (e.g., the current usage score), $X_n$ may represent the nth usage rate for the application (e.g., the accumulated usage time during the last calculation period), a may represent a weight assigned to the previous usage score in calculating the current usage score, q may represent a degree of weighting decrease after the cold start phase, T may represent the length of the cold start phase, β may represent a regulation factor for weighting decay in the cold start phase, and C may represent the operation time count in sequence starting from 1 (e.g., the number of calculation periods since the computing device started to perform the process for updating customized application information). The weighting decay may indicate the changing of the weights assigned to $Y_{n-1}$ and $X_n$ for determining $Y_n$. For example, the weight assigned to $X_n$ may decrease during the cold start phase. In some examples, T may correspond to 20 days, and q may correspond to 0.95. According to the above equations, during the cold start phase, α may increase with the number of calculation periods, and after the cold start phase, a may be set to a constant value q (e.g., 0.95).

Figure 11:
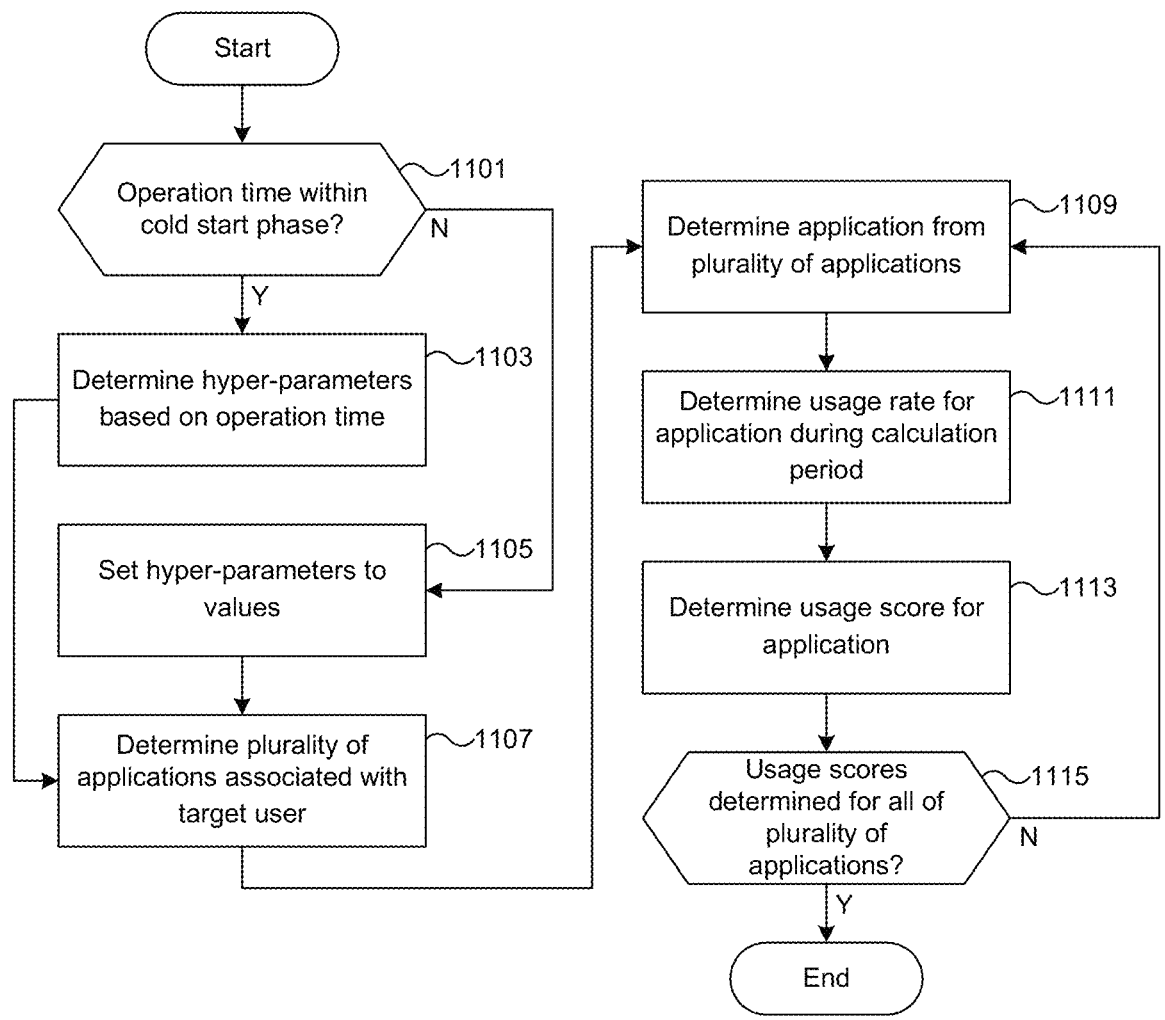
FIG. 11 is a flowchart showing an example method for determining usage scores for applications associated with a target user.

FIG. 11 is a flowchart showing an example method for determining usage scores for applications associated with a target user. In step 1101, the computing device may determine whether an operation time is within a cold start phase. The operation time may correspond to a period of time since the computing device started to perform the processes for updating customized application information. The computing device may record the operation time. In some examples, the operation time may be specific to a particular user. For example, the computing device may start to perform the processes for updating the application information for a first user on Jan. 1, 2019, and may start to perform the processes for updating the application information for a second user on Jan. 15, 2019. The computing device may record a separate operation time value for individual users. The cold start phase may indicate a time period during which the computing device may have an amount of data less than an optimal amount of data for determining the customized application information. The cold start phase may, for example, be set by an administrator to 20 days. If the operation time (e.g., for the target user) is within the cold start phase (step 1101: Y), the method may proceed to step 1103. If the operation time (e.g., for the target user) is not within the cold start phase (step 1101: N), the method may proceed to step 1105.

In step 1103, the computing device may determine hyper-parameters based on the operation time. For example, the computing device may determine the hyper-parameter α according to equations (2) and (3) based on the current operation time count C. In step 1105, the computing device may set hyper-parameters to values (e.g., constant values). For example, after the computing device has passed the cold start phase, the computing device may set the hyper-parameter α of equation (1) to a constant value, such as 0.95. Using different processes to determine the hyper-parameters may help mitigate the bias variance associated with the cold start phase.

In step 1107, the computing device may determine a plurality of applications associated with the target user. In some examples, the plurality of applications associated with the target user may comprise all of the applications that the target user is allowed to access. The computing device may make this determination, for example, based on obtaining such information from the delivery controller 711. In some examples, the plurality of applications associated with the target user may comprise some of the applications that the target user is allowed to access. In some examples, the plurality of applications associated with the target user may comprise applications that the target user actually accessed during the last calculation period (e.g., during the last 24 hours).

In step 1109, the computing device may determine an application from the plurality of applications as determined in step 1107. For example, the computing device may sequentially determine (e.g., identify), from the plurality of applications, an application for processing. In step 1111, the computing device may determine a usage rate for the application determined in step 1109 during the last calculation period (e.g., during the last 24 hours). For example, the computing device may retrieve stored application usage events that indicate the target user, indicate the application as determined in step 1109, and indicating an application usage time length within the last calculation period. The computing device may aggregate the application usage time lengths of these application usage events to reach the usage rate for the application (e.g., the usage rate indicating a total amount of time, of the last calculation period, during which the application was used). In some examples, individual application usage events may additionally indicate an application usage type (e.g., application usage via an active window, application usage via a non-active but fully or partially displaying window, etc.) and/or a weight corresponding to the application usage type. The computing device may determine the usage rate for the application based on the application usage type and/or the weight. For example, the usage rate may correspond to a sum of the application usage time lengths multiplied by the corresponding weights. In some examples, the determining of the usage rates of applications may be offloaded to the user devices that monitor and/or generate application usage event records. For example, the user devices may send, to the computing device, the determined usage rates instead of date indicating application usage events.

In step 1113, the computing device may determine a usage score for the application as determined in step 1109. For example, the computing device may determine the usage score based on the equation (1). The usage score for the application may correspond to a weighted average (according to the hyper-parameter α) of the previous value of the usage score and the usage rate, for the application during the last calculation period, as determined in step 1111.

In step 1115, the computing device may determine whether usage scores have been determined (e.g., based on application usage event data from the last calculation period) for all of the plurality of applications as determined in step 1107. If usage scores have been determined for all of the plurality of applications (step 1115: Y), the method may end. If usage scores have not been determined for all of the plurality of applications (step 1115: N), the method may repeat step 1109. For example, the computing device may determine, from the plurality of application, a next application for processing.

Referring back to FIG. 10, in step 1013, the computing device may select top ranked application(s) based on the usage scores as determined in step 1011 (and/or step 1113). In some examples, the computing device may select a number (e.g., 5, 10, 15, etc.) of top ranked applications based on the usage scores of the applications. In some examples, the computing device may select a number of top ranked applications based on a usage score threshold that separates regularly used applications from non-regularly used applications. The computing device may select a particular application if the usage score for the application is above the usage score threshold. The computing device might not select a particular application if the usage score for the application is not above the usage score threshold. With these processes, the computing device may determine applications that the target user regularly uses (e.g., for including in the customized application information for the target user). Additionally or alternatively, the computing device may determine applications that users similar to the target user use (e.g., for recommending to the target user and/or for including in the application information for the target user), as described in greater detail below.

In step 1015, the computing device may determine user group(s) similar to the user group in which the target user is a member. The determination may be based on, for example, the application usage pattern of each user group of the enterprise organization in which the target user is a member. The application usage pattern of a user group may be represented, for example, using a set of applications in which individual applications have a usage time, score, or rate per user of the user group higher than a threshold. In some examples, the application usage pattern of a user group may be represented using a vector indicating the usage time, score, or rate per user for each of the applications that the user group is allowed to access. The application usage pattern of a user group may be represented in various other manners as desired by a person of ordinary skill in the art. The computing device may determine that a particular user group is similar to the user group of the target user, for example, if the application usage pattern of the particular user group is similar to the application usage pattern of the user group of the target user to an extent above a threshold (e.g., if the distance between the sets or vectors representing the application usage patterns is less than a threshold distance).

Figure 12:
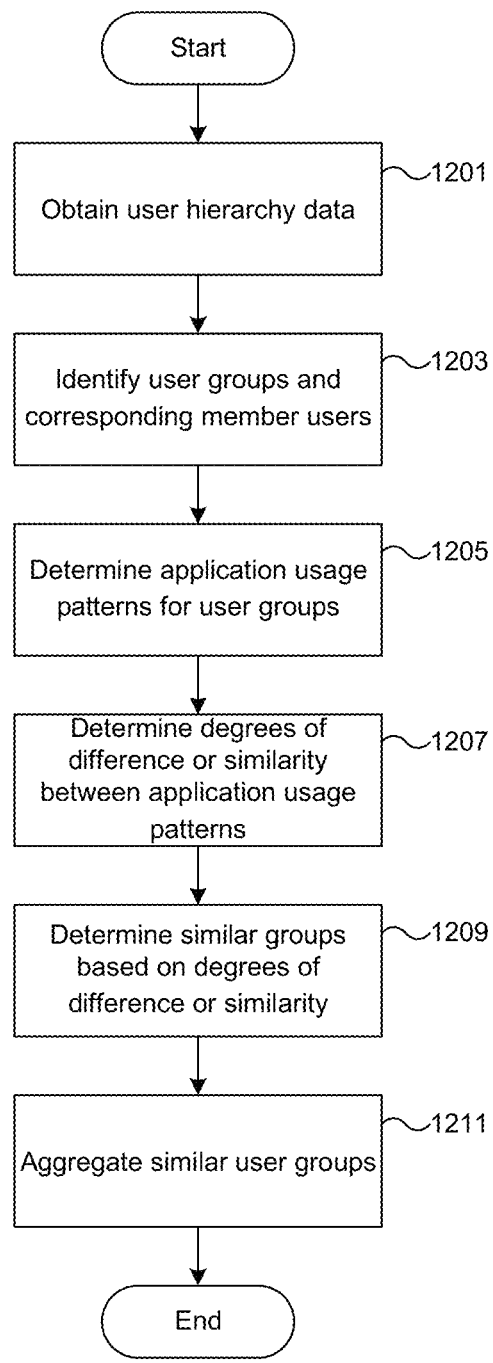
FIG. 12 is a flowchart showing an example method for determining user group(s) similar to the user group in which the target user is a member.
Figure 14:
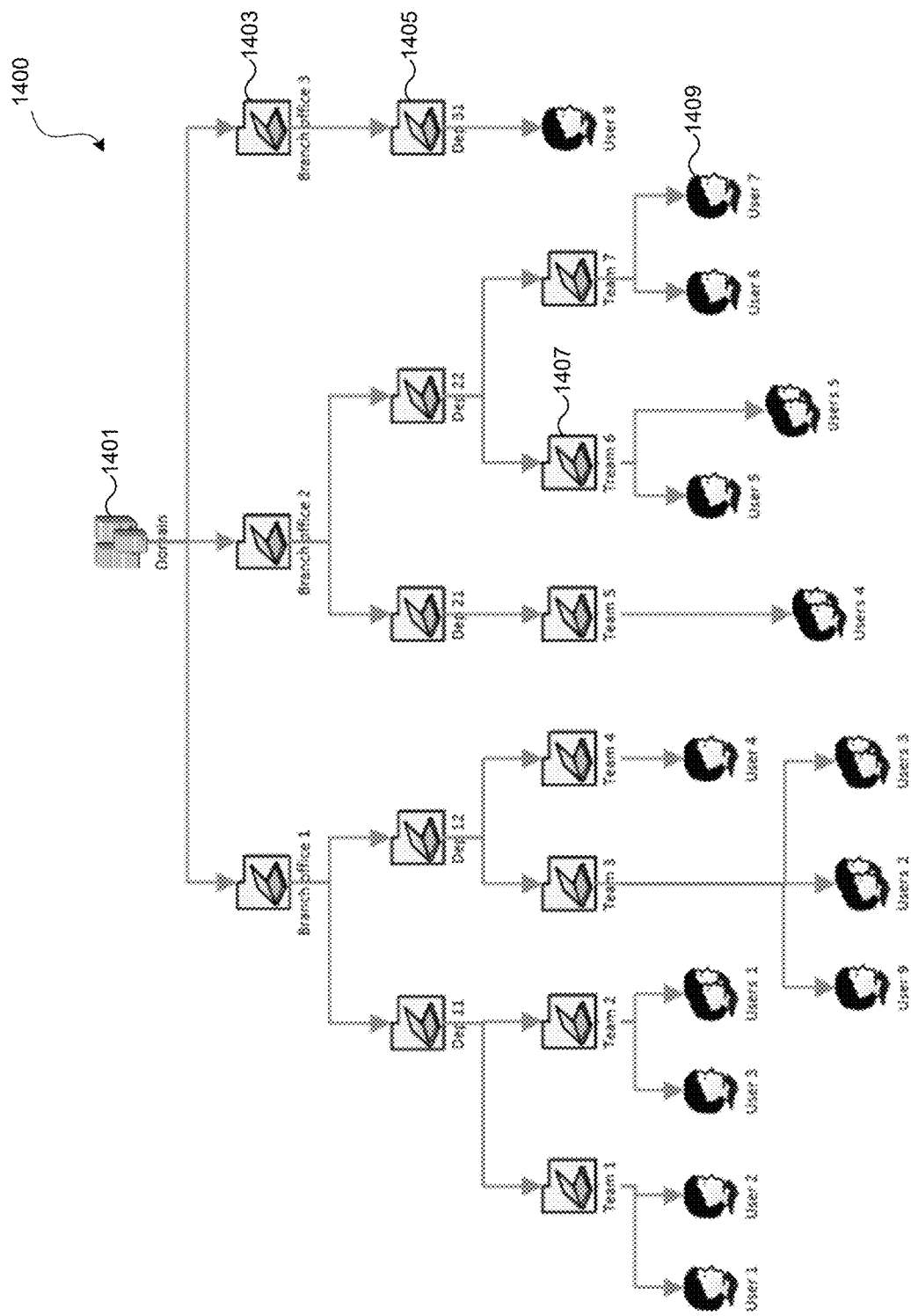
FIG. 14 is a schematic diagram showing an example user hierarchy with which features described herein may be implemented.

FIG. 12 is a flowchart showing an example method for determining user group(s) similar to the user group in which the target user is a member. In step 1201, the computing device may obtain user hierarchy data and/or other types of data based on which user groups may be identified. For example, the computing device may receive, from the directory device 709, user hierarchy data for an enterprise organization in which the target user is a member. FIG. 14 is a schematic diagram showing an example user hierarchy 1400. The user hierarchy 1400 may be associated with an enterprise organization. The user hierarchy 1400 may comprise one or more levels, such as one or more domains (e.g., domain 1401), one or more branch offices (e.g., branch office 1403), one or more departments (e.g., department 1405), one or more teams (e.g., team 1407), and/or one or more users (e.g., user 1409). The user hierarchy 1400 may represent the enterprise organization's managerial structure, geographical structure, and/or other types of structures. Various users may be grouped in different user groups. For example, user 1 and user 2 are within the user group team 1, and user 6 and user 7 are within the user group team 7. In some examples, different user groups of an enterprise organization may have similar application usage patterns. For example, team 1 and team 7 may be both engineering groups, and may have similar application usage patterns, although they may be separate user groups because of their different geographical locations.

Referring back to FIG. 12, in step 1203, the computing device may identify user groups and corresponding member users. For example, the computing device may traverse the user hierarchies obtained in step 1201 to identify the user groups of the enterprise organization in which the target user is a member. The computing device may traverse all the organizational unit paths in the user hierarchies until the leaf nodes. In some examples, individual organization unit paths may correspond to one different user group. The computing device may also determine which users are within individual identified user groups.

In step 1205, the computing device may determine application usage patterns for the user groups identified in step 1203. In some examples, the application usage pattern of a user group may be represented using a set of applications in which individual applications have a usage time, score, or rate per user of the user group higher than a threshold. As an example, to determine the application usage pattern for a user group, the computing device may determine the accumulated usage time for individual applications that the user group is allowed to access during a period of time (e.g., last 20 days). The accumulated usage time may correspond to a sum of the usage time of the corresponding application from individual users in the user group. The computing device may determine a usage time per user by dividing the accumulated usage time by the quantity of users in the user group. The computing device may include the application in the set of applications representing the user group's application usage pattern if the determined usage time per user is higher than a threshold. The computing device might not include the application in the set of applications if the determined usage time per user is not higher than the threshold. The following shows an example table of determined application usage patterns for the user groups.

TABLE 1

| User group | Application usage pattern |
| --- | --- |
| Team 1 | {App A, App B, App C, App D, App E, App F} |
| Team 3 | {App A, App B, App C, App D, App Y} |
| Team 4 | {App A, App B, App H, App I, App G} |
| Team 7 | {App A, App B, App C, App E, App F, App O} |

In step 1207, the computing device may determine degrees of difference or similarity (e.g., distances) between the application usage patterns as determined in step 1205. The distances between the application usage patterns may comprise, for example, distances between vectors representing the application usage patterns. For example, the Jaccard index may be used to measure the distances between the application usage patterns. As an example, the distances between the application usage patterns may be determined according to the following equation(s):

$$IoU_{i,j} = \frac{(G_i - \bigcap_{k=1}^{N} G_k) \cap (G_j - \bigcap_{k=1}^{N} G_k)}{(G_i - \bigcap_{k=1}^{N} G_k) \cup (G_j - \bigcap_{k=1}^{N} G_k)} \quad (4)$$

In the equation (4), $G_i$ or $G_j$ may represent the application usage pattern for a particular user group, such as the ith or jth user group, and $IoU_{i,j}$ may represent a degree of similarity (e.g., Intersection over Union) between the ith user group and the jth user group. $\bigcap_{k=1}^{N} G_k$ may represent the globally intersected elements among all of the user groups. For example, the global intersection of the application usage patterns for Team 1, Team 3, Team 4, and Team 7 according to Table-1 is {App A, App B}. $G_i - \bigcap_{k=1}^{N} G_k$ may represent excluding the globally intersected elements from the application usage pattern for the ith user group. For example, the following shows an example table of the application usage patterns for the user groups with the globally intersected elements removed.

TABLE 2

| User group | Application usage pattern with globally intersected elements removed |
| --- | --- |
| Team 1 | {App C, App D, App E, App F} |
| Team 3 | {App C, App D, App Y} |
| Team 4 | {App H, App I, App G} |
| Team 7 | {App C, App E, App F, App O} |

The computing device may calculate the degrees of difference or similarity (e.g., distances) between the application usage patterns according to the equation (4). For example, $IoU_{13}$ is ⅖, $IoU_{17}$ is ⅗, and $IoU_{37}$ is ⅙. In some examples, the Jaccard distance measures how similar two groups are in terms of their preferences on non-globally common applications. The non-globally common applications may comprise, for example, applications that are common between the two groups, but are not common among all user groups including the two user groups. In calculating the distances among the user groups, the computing device may build, based on the application usage patterns with globally intersected elements removed, a spare symmetric matrix. FIG. 15 shows an example of a spare symmetric matrix 1500. The spare symmetric matrix 1500 may be used to determine which combination of user groups should be further processed. Numbers in the matrix 1500 indicate how many applications both user groups have in common. For example, user group Team 1 and user group Team 3 have 2 overlapping applications because there is a number 2 within the box under the column for Team 1 and within the row of Team 3. The computing device may continue to calculate the distance (e.g., the IoU value) for a combination of two user group if the two user groups have overlapping applications. The computing device might not calculate the distance (e.g., the IoU value) for the combination of the two groups if the two user groups do not have overlapping applications. In this manner, less computation may be required for determining the distances among the user groups.

In step 1209, the computing device may determine similar user groups based on the degrees of difference or similarity (e.g., distances) as determined in step 1207. The computing device may identify user groups having similar application usage patterns as the user group in which the target user is a member. The computing device may determine that a particular user group is similar to the user group in which the target user is a member, for example, if the distance between the application usage patterns of the two user groups is lower than a threshold, and/or if the degree of similarity between the application usage patterns of the two user groups is higher than a threshold. For example, the computing device may determine that two user groups are similar if the IoU between the two user groups is higher than a threshold (e.g., 0.5).

In step 1211, the computing device may aggregate similar user groups into a set of users, based on which new applications may be determined for recommending to the target user. For example, the computing device may determine a set of users to include the users from the user group in which the target user is a member and the users from the user groups similar to the user group of the target user. As described in greater detail below, the computing device may use the determined set of users for determining new applications for recommending to the target user.

Referring back to FIG. 10, in step 1017, the computing device may determine similar users to the target user. The similar users to the target user may have similar application usage patterns as the target user. For example, the similar users may be selected from the set of users as determined in step 1211. In some examples, the similar users may be selected from all of the users in the enterprise organization in which the target user is also a member. The computing device may rank the users based on their degrees of similarity with the target user in terms of their application usage patterns. The computing device may identify a number of top ranked users as the similar users.

In step 1019, the computing device may determine recommended applications (e.g., for recommending to the target user) based on the application usage of the similar users as determined in step 1017. The recommended applications may comprise applications that the target user rarely uses but the similar users regularly use. By recommending these applications to the target user, the target user may learn new applications that his or her peers find helpful. More details regarding determining similar users to the target user (step 1017) and/or determining recommended applications (step 1019) are described below.

Figure 13:
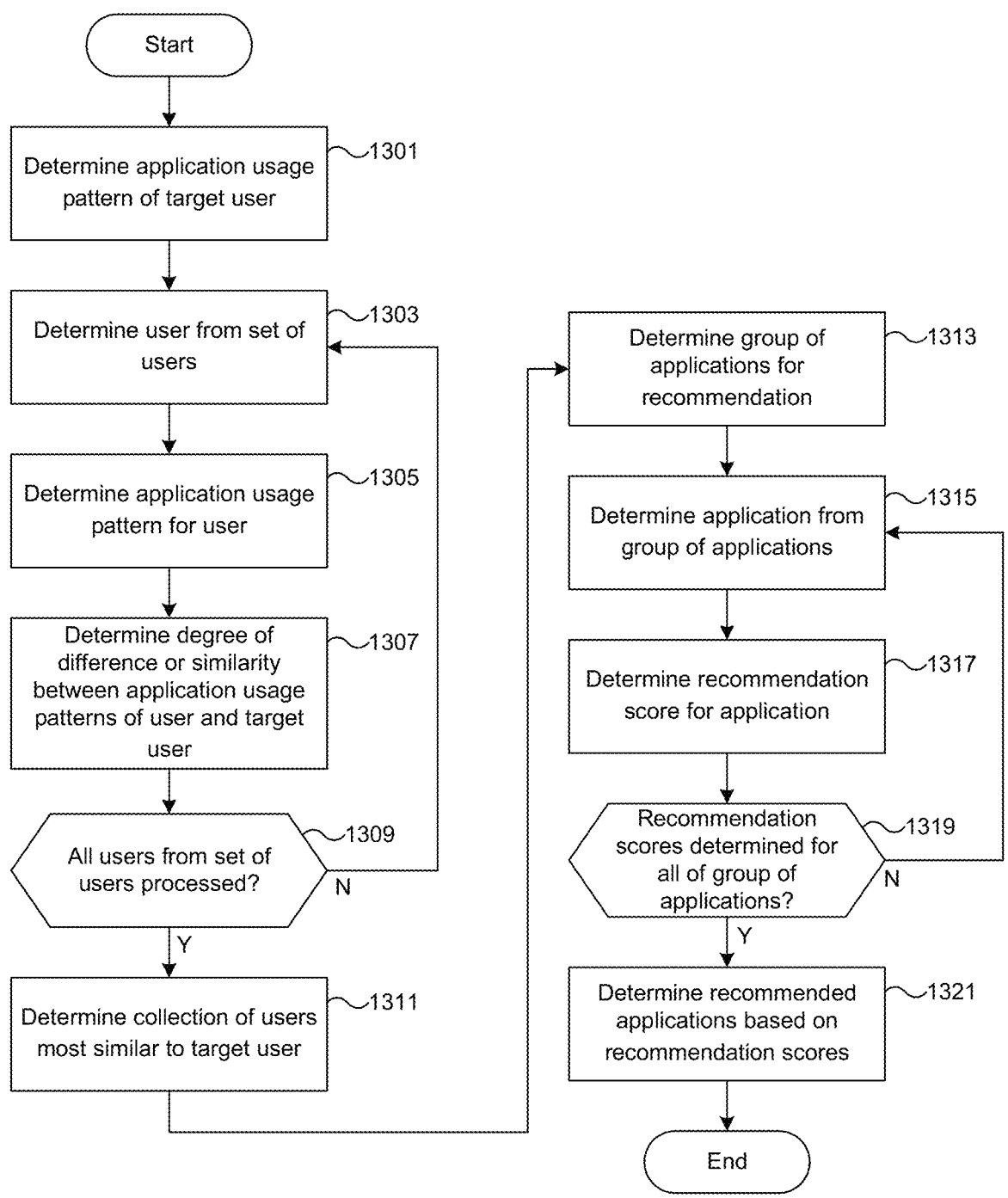
FIG. 13 is a flowchart showing an example method for determining recommended applications based on application usage of similar users to the target user.

FIG. 13 is a flowchart showing an example method for determining recommended applications based on application usage of similar users to the target user. In step 1301, the computing device may determine the application usage pattern of the target user. The application usage pattern of the target user may be represented using, for example, a vector indicating the usage time, score, or rate by the target user for individual applications (e.g., each of the applications) that the target user is allowed to access. For example, the following shows an example table of the application usage pattern of the target user.

TABLE 3

| User group | User | App A | APP B | APP C | APP D | APP E | APP F | APP G | App H |
|---|---|---|---|---|---|---|---|---|---|
| Team 1 | User 1 (e.g., the target user) | 1650 | 1780 | 140 | 10 | 0 | 0 | 0 | 0 |

As shown in Table-3, the application usage pattern for user 1 may comprise a vector (1650, 1780, 140, 10, 0, 0, 0, 0). Individual elements (e.g., each element) of the vector may indicate an accumulated amount of time, of a past time period (e.g., the last 20 days), during which the target user used the corresponding application.

In step 1303, the computing device may determine a user from a set of users as determined in step 1211. In some examples, the computing device may determine a user from a larger set of users, such as from all of the users of the enterprise organization in which the target user is a member. For example, the computing device may sequentially select, from the set of users, a user for processing (as described below in connection with steps 1305, 1307). In step 1309, the computing device may determine whether all of the set of users have been processed (e.g., according to steps 1305, 1307). If all of the set of users have been processed (step 1309: Y), the method may proceed to step 1311. If not all of the set of users have been processed (step 1309: N), the method may repeat step 1303. For example, the computing device may select, from the set of users, a next user for processing.

In step 1305, the computing device may determine the application usage pattern for the user determined in step 1303. The application usage pattern for the user may be determined in a similar manner as the application usage pattern for the target user may be determined, as described in connection with step 1301. For example, the following shows an example table of the application usage patterns of one or more users of the set of users.

TABLE 4

| User group | User | App A | APP B | APP C | APP D | APP E | APP F | APP G | App H |
|---|---|---|---|---|---|---|---|---|---|
| Team 1 | User 2 | 1500 | 1600 | 128 | 330 | 230 | 400 | 10 | 0 |
| Team 7 | User 6 | 800 | 1400 | 400 | 130 | 300 | 0 | 120 | 0 |
| Team 7 | User 7 | 1000 | 1820 | 40 | 270 | 120 | 230 | 60 | 30 |

In step 1307, the computing device may determine a degree of difference or similarity (e.g., distance) between the application usage patterns of the user (as determined in step 1303) and the target user. In some examples, the computing device may determine a degree of similarity between the application usage patterns of the user (as determined in step 1303) and the target user. As an example, the degree of difference or similarity (e.g., distance) may be determined according to the following equation(s):

$$S_{uv} = \frac{\sum_{i \in I_{uv}} (r_{ui} - \overline{r_u})(r_{vi} - \overline{r_v})}{\sqrt{\sum_{i \in I_{uv}} (r_{ui} - \overline{r_u})^2} \sqrt{\sum_{i \in I_{uv}} (r_{vi} - \overline{r_v})^2}} \quad (5)$$

$$I_{uv} = A_u \cap A_v \text{ where } A_u \neq 0 || A_v \neq 0 \quad (6)$$

In the equations (5) and (6), u may represent the target user, v may represent a user from the set of users, $S_{uv}$ may represent a correlation between the target user and the user from the set of users, $I_{uv}$ may represent common applications that both the target user and the user from the set of users used (e.g., during the last 20 days), r may represent the amount of time during which a particular user used a particular application, $\overline{r}$ may represent the amount of time during which a particular user used the common applications divided by the quantity of the common applications, and $A_u$ may represent a set of applications that a particular user (e.g., the user u) used (e.g., during the last 20 days).

In step 1311, the computing determine, from the set of users (e.g., as processed in steps 1305, 1307), a collection of users that are most similar to the target user. The computing device may rank the set of users based on their respective degrees of difference or similarity (e.g., distances) with the target user in terms of their application usage patterns. The computing device may determine the collection of users to be a number of top ranked users. In some examples, the computing device may determine the collection of users to be the top ranked users whose distances with the target user in terms of their application usage patterns are below a threshold distance and/or whose degrees of similarities with the target user in terms of their application usage patterns are above a threshold degree of similarity.

In step 1313, the computing device may determine a group of applications from which recommended applications may be selected for recommending to the target user. The group of applications may comprise, for examples, applications that the target user rarely uses but the collection of users (as determined in step 1311) use (e.g., during a number of previous calculation periods). For example, the group of applications may be determined based on the amounts of application usage from the target user and/or the collection of users as determined in step 1311. The computing device may use data such as those indicated in Table-3 and Table-4. The computing device may determine whether a particular user rarely uses or regularly uses an application based on determining whether the amount of usage of the application by the user satisfies a threshold.

In step 1315, the computing device may determine, from the group of applications as determined in step 1313, an application for which a recommendation score may be determined (e.g., according to step 1317 as described in greater detail below). For example, the computing device may (e.g., sequentially, randomly, etc.) select, from the group of applications, an application for which a recommendation score may be determined. In step 1319, the computing device may determine whether recommendation scores have been determined for all of the group of applications. If recommendation scores have been determined for all of the group of applications (step 1319: Y), the method may proceed to step 1321. If recommendation scores have not been determined for all of the group of applications (step 1319: N), the method may repeat step 1315. For example, the computing device may select, from the group of applications, a next application, and may determine a recommendation score for that application.

In step 1317, the computing device may determine a recommendation score for the application as determined in step 1315. The recommendation score for the application may be determined based on usage of the application by the collection of users determined in step 1311. As one example, recommendation score for the application may be determined according to the following equation(s):

$$p_{ui} = \frac{\sum_{v \in S(u,k)} (r_{vi} - \overline{r_v}) \times S_{uv}}{\sum_{v \in S(u,k)} S_{uv}} \quad (7)$$

In the equation (7), u may represent the target user, i may represent an index for an application from the group of applications, $p_{ui}$ may represent a recommendation score to the target user for the ith application from the group of applications, S(u, k) may represent the collection of users (e.g., determined in step 1311), $S_{uv}$ may represent the degree of similarity on application usage between the target user and a user v from the collection of the users, $r_{vi}$ may represent the amount of time (e.g., of the last 20 days) during which the user v used the ith application, $\overline{r_v}$ may represent the amount of time (e.g., of the last 20 days) during which the user v used the group of applications (determined in step 1313) divided by the quantity of the group of applications. In some examples, $S_{uv}$ may be calculated according to the equations (5) and (6) as described above.

For example, the following shows an example table of the determined recommendation scores.

TABLE 5

| User group | User | Similarity | APP D | APP E | APP F | APP G | App H |
|---|---|---|---|---|---|---|---|
| Team 1 | User 2 | 0.9867 | 330 | 230 | 400 | 10 | 0 |
| Team 7 | User 6 | 0.9068 | 130 | 300 | 0 | 120 | 0 |
| Team 7 | User 7 | 0.9155 | 270 | 120 | 230 | 60 | 30 |
| Recommendation Score | | | 95.94 | 66.81 | 65.53 | −88.12 | −140.15 |

As shown in the example of Table-5, the computing device may determine the group of applications (step 1313) to comprise App D, App, E, App F, App G, App H. Recommendation scores may be determined for each of these applications, for example, according to the equation (7).

In step 1321, the computing device may determine recommended applications based on the recommendation scores determined in step 1317. The computing device may rank the group of applications (as determined in step 1313) based on their respective recommendation scores. The computing device may determine the recommended applications to be a quantity (e.g., 5) of top ranked applications. In some examples, the computing device may determine the recommended applications to be the top ranked applications with recommendation scores higher than a threshold (e.g., 0).

Referring back to FIG. 10, in step 1021, the computing device may send the top ranked application(s) as determined in step 1013 and/or the recommended applications as determined in step 1019 (and/or step 1321). For example, the computing device may send information indicating these applications to the delivery controller 711 for presenting to the target user as customized application information. In some examples, the information indicating these applications may be sent directly or indirectly to any other computing device (such as the user device 701A corresponding to the target user). In some examples, the user device 701A may display, on a user interface of the user device 701A, the application information for (e.g., customized to) the target user associated with the user device 701A as determined by the computing device. The user device 701A may display the application information (e.g., customized application information) in various manners. For example, applications indicated in the customized application information may be presented as icons, textual identifiers, buttons, toggles, etc., the selection of which (e.g., by the target user via an input device) may cause the user device 701A and/or associated computing device(s) (e.g., an application virtualization platform) to implement the selected application and to present the implemented application to the user. With the application information (e.g., customized application lists) displayed on user interfaces, users may have expedited access to interested applications.

The application information (e.g., customized application list, customized application set, customized application collection, etc.) for the target user may indicate the top ranked applications and the recommended applications. The top ranked applications indicated in the information may be organized in the order of their respective usage score rankings (e.g., from high scores to low scores). The recommended applications indicated in the information may be organized in the order of their respective recommendation score rankings (e.g., from high scores to low scores) and may be appended to the end of the top ranked applications. The applications indicated in the information (e.g., list) may be presented and/or organized on a user interface in the order according to their rankings. In some examples, a user device may present the application information using two sections to separately display the top ranked applications and the recommended applications. And individual sections of the two sections may indicate to the user which type of applications the section is presenting (e.g., using a title for the section). For example, the user device may display a first section titled "top ranked applications," and a second section titled "recommended application." The first section and the second section may be displayed on a same user interface page or on different user interface pages (e.g., different tabs).

Figure 16:
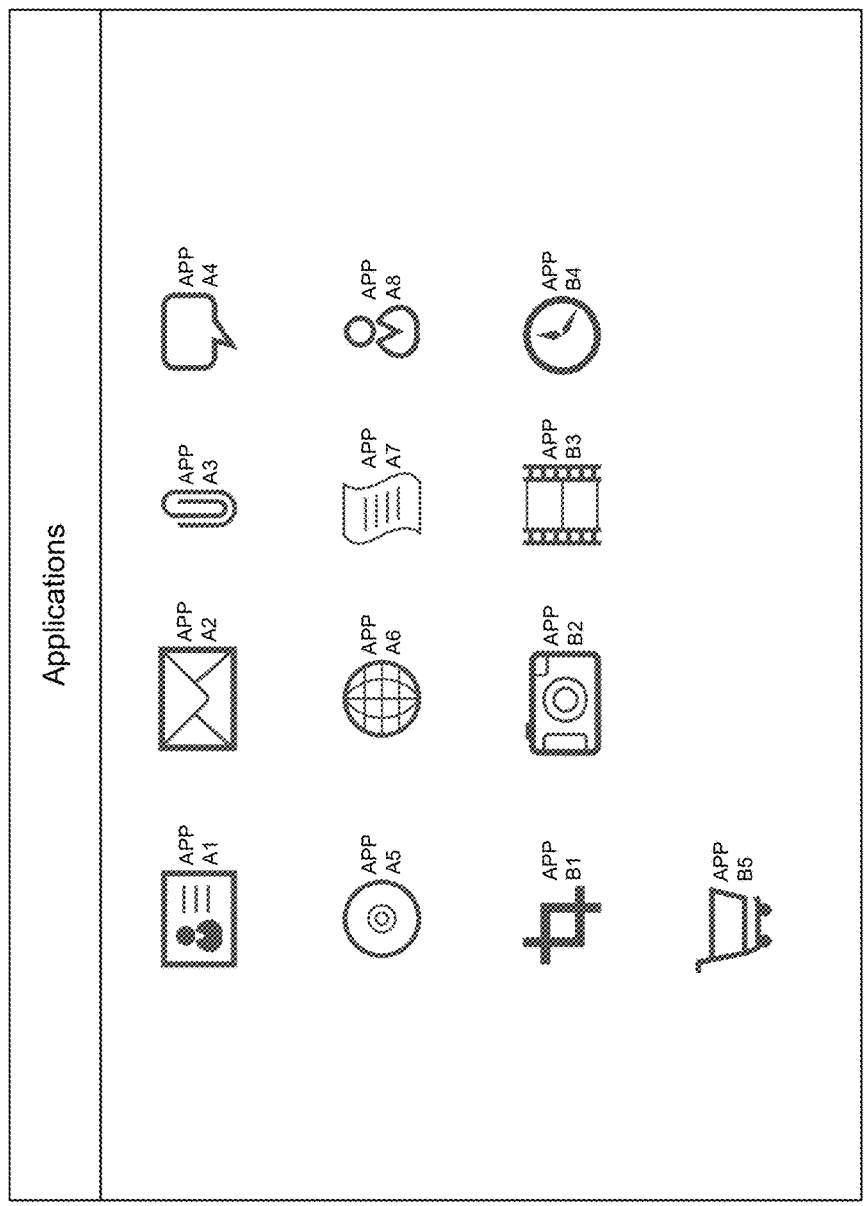
FIG. 16 shows an example user interface for expedited access to applications.

FIG. 16 shows an example user interface 1600 for expedited access to applications. The user interface 1600 may be implemented on a computing device (e.g., a personal computer or a mobile device). For example, the user interface 1600 may be displayed on a screen of the computing device. The user interface 1600 may indicate one or more applications (e.g., customized applications) for selection by a user. The applications indicated in the user interface 1600 are shown in the form of icons, but they may be represented in other desired forms. The selection of an application from the user interface 1600 may cause the computing device and/or associated computing devices to implement the application, and/or may cause the implemented application to be outputted (e.g., via the screen of the computing device for the user's instant access). As shown in FIG. 16, the user interface 1600 may indicate a title "Customized Applications," and may indicate a plurality of applications, such as APP A1 to APP A8 and APP B1 to APP B5. APP A1 to APP A8 may correspond to the top ranked applications as determined using the processes described herein for the user associated with the computing device. APP B1 to APP B5 may correspond to the recommended applications as determined using the processes described herein for the user associated with the computing device. APP A1 to APP A8 may be ordered based on their respective usage score rankings (e.g., from high scores to low scores). APP B1 to APP B5 may be ordered based on their respective recommendation score rankings (e.g., from high scores to low scores), and may be appended to the end of the top ranked applications APP A1 to APP A8. The user interface 1600 may be organized in other desired manners, such as showing the application identifiers in a single column or showing the application identifiers in a single row.

Figure 17A:
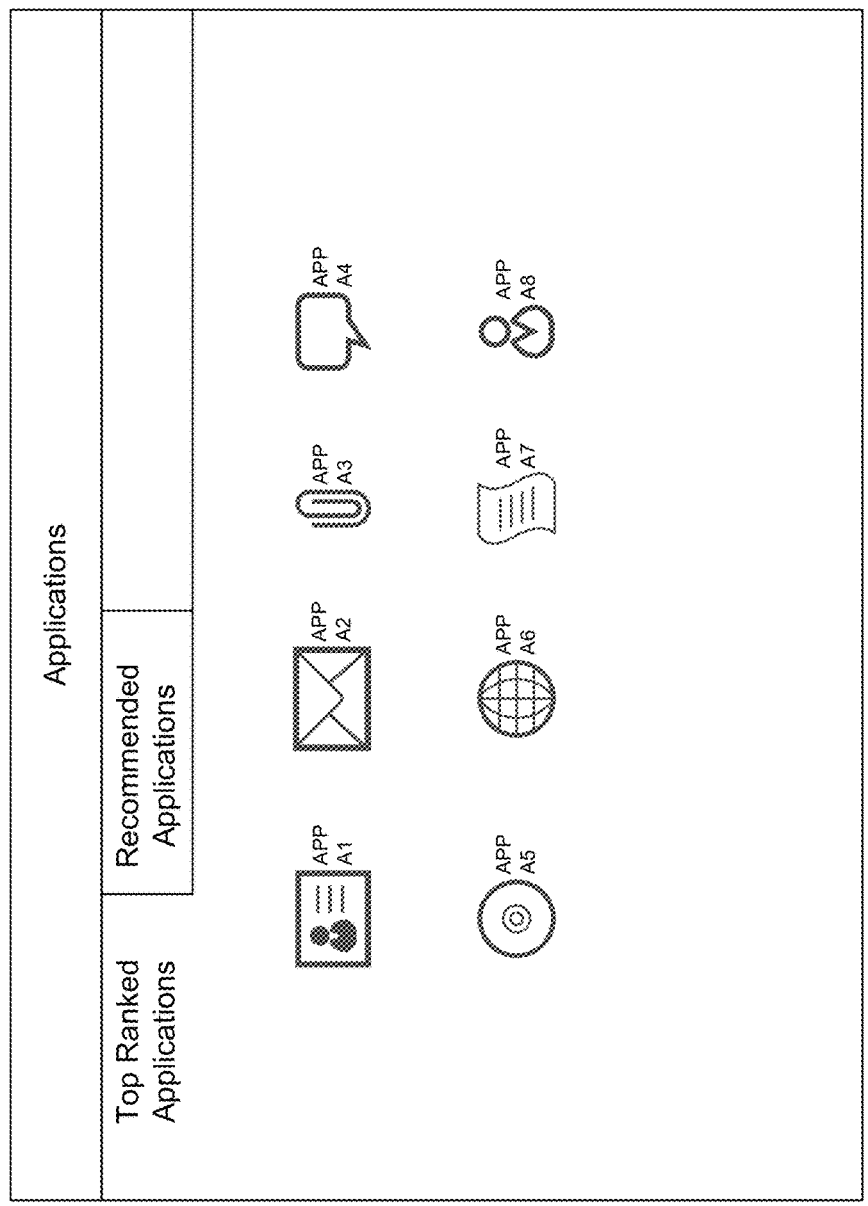
FIGS. 17A-17B show example user interfaces for expedited access to applications.
Figure 17B:
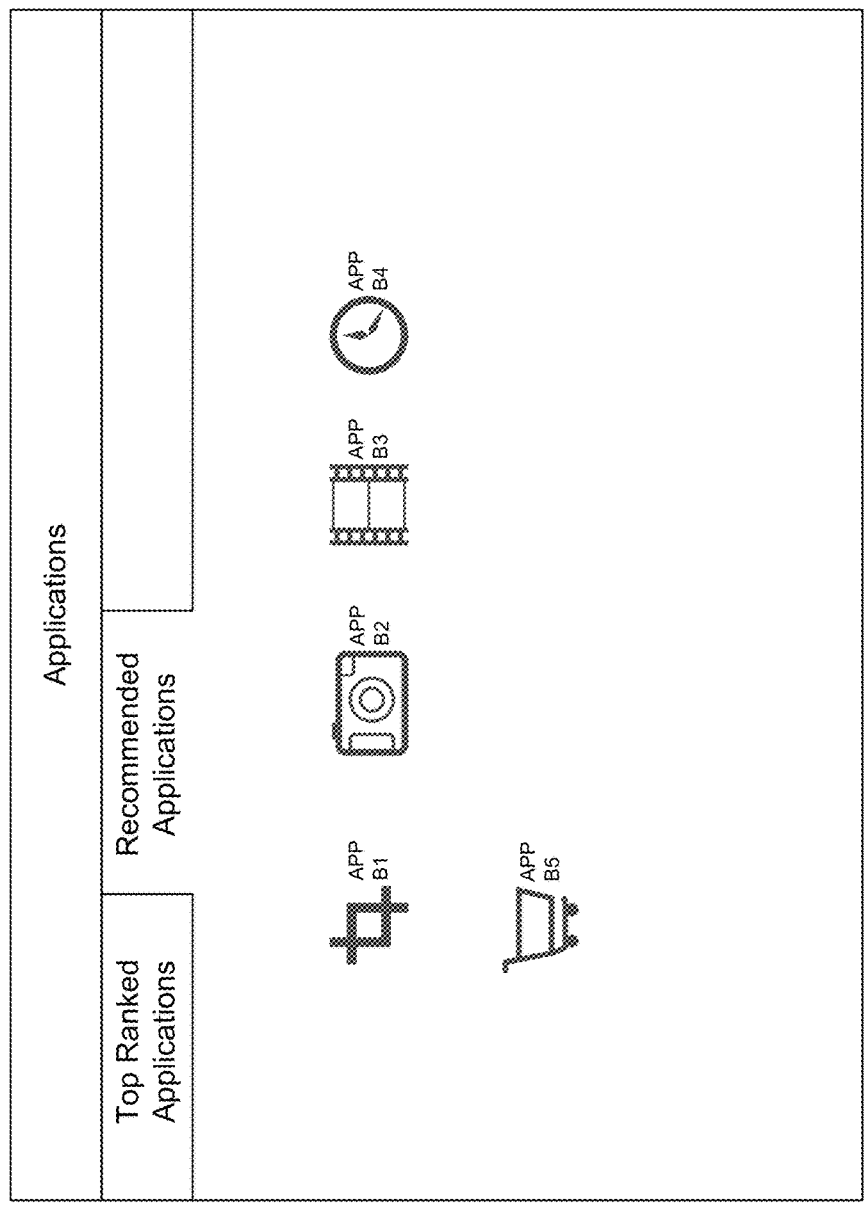

FIGS. 17A-17B show example user interfaces 1700, 1750 for expedited access to applications. The user interfaces 1700, 1750 are similar to the user interface 1600, but show the top ranked applications APP A1 to APP A8 and the recommended applications APP B1 to APP B5 separately in two tabs. For example, when the tab "Top Ranked Applications" is activated, the top ranked applications APP A1 to APP A8 may be shown in the user interface 1700. When the tab "Recommended Applications" is activated, the recommended applications APP B1 to APP B5 may be shown in the user interface 1750. The applications shown in the user interfaces 1700, 1750 may be selected by a user for instant access of the selected applications.

Figure 18:
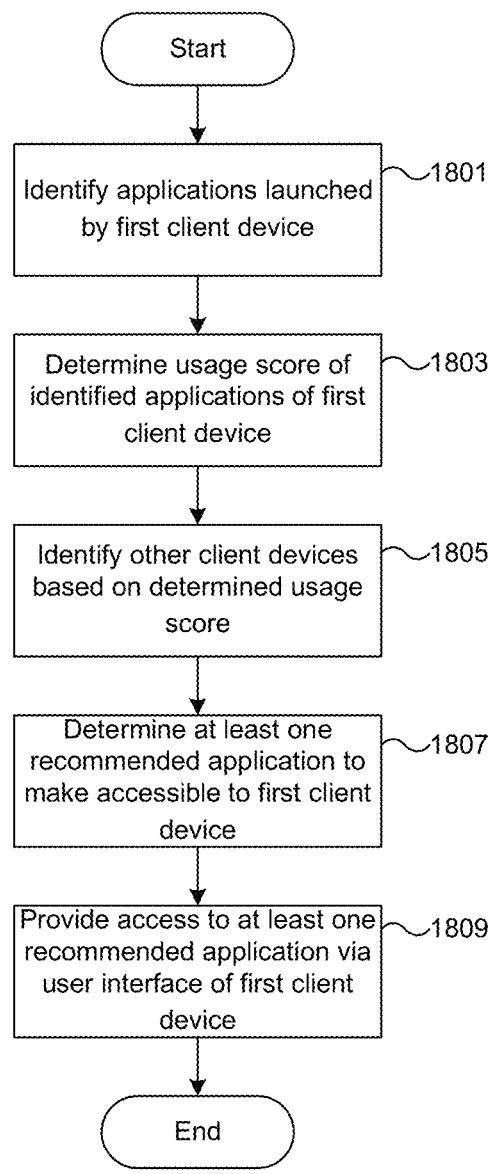
FIG. 18 is a flowchart showing an example method for providing expedited excess to applications.

FIG. 18 is a flowchart showing an example method for providing expedited excess to applications. In step 1801, a computing device may identify applications launched by a first client device, the identification including a determination of an amount of time in which individual applications were in use on the first client device, as described above in greater detail in connection with, for example, step 1111 of FIG. 11. In step 1803, the computing device may determine a usage score of the identified applications of the first client device based on the determined amount of time in which the individual applications were in use, as described above in greater detail in connection with, for example, step 1113 of FIG. 11. In step 1805, the computing device may identify other client devices based on the determined usage score of the identified applications launched by the first client device, as described above in greater detail in connection with, for example, step 1311 of FIG. 13. In step 1807, the computing device may determine at least one recommended application to make accessible to the first client device, the at least one recommended application being an application of at least one of the identified other client devices, as described above in greater detail in connection with, for example, step 1321 of FIG. 13. In some examples, the at least one recommended application may include a usage score approximate to a usage score of an identified application of the first client device. In step 1809, the computing device may provide access to the at least one recommended application via a user interface of the first client device so as to reduce time in which to launch the at least one recommended application via the first client device, as described above in greater detail in connection with, for example, step 1021 of FIG. 10 and steps 913 and 915 of FIG. 9.

The following paragraphs (M1) through (M14) describe examples of methods that may be implemented in accordance with the present disclosure.

(M1) A method comprising: identifying, by a computing device, applications launched by a first client device, the identification including a determination of an amount of time in which individual applications were in use on the first client device; determining, by the computing device, a usage score of the identified applications of the first client device based on the determined amount of time in which the individual applications were in use; identifying, by the computing device, other client devices based on the determined usage score of the identified applications launched by the first client device; determining, by the computing device, at least one recommended application to make accessible to the first client device, the at least one recommended application being an application of at least one of the identified other client devices; and providing, by the computing device, access to the at least one recommended application via a user interface of the first client device so as to reduce time in which to launch the at least one recommended application via the first client device.

(M2) A method may be performed as described in paragraph (M1) further comprising: receiving, by the computing device and from the first client device, data indicating an application usage event; wherein the application usage event indicates a first application outputted via the first client device and a time interval during which the first application was outputted via the first client device.

(M3) A method may be performed as described in any of paragraphs (M1) through (M2) wherein the amount of time in which the individual applications were in use on the first client device indicates an amount of time during which the individual applications were outputted via an active window of a desktop of the first client device.

(M4) A method may be performed as described in any of paragraphs (M1) through (M3) wherein the amount of time in which the individual applications were in use on the first client device indicates an amount of time within a first calculation period, and wherein the determining the usage score of the identified applications of the first client device is based on one or more amounts of time within one or more second calculation periods.

(M5) A method may be performed as described in any of paragraphs (M1) through (M4) further comprising: assigning, by the computing device, different weights to the amount of time within the first calculation period and the one or more amounts of time within the one or more second calculation periods; wherein the determining the usage score of the identified applications of the first client device is based on the different weights.

(M6) A method may be performed as described in any of paragraphs (M1) through (M5) wherein the determining the usage score of the identified applications of the first client device is based on a previous usage score of the identified applications of the first client device.

(M7) A method may be performed as described in any of paragraphs (M1) through (M6) wherein the determining the usage score of the identified applications of the first client device comprises: assigning, by the computing device, a first weight to the amount of time in which the individual applications were in use on the first client device; and assigning, by the computing device, a second weight to the previous usage score of the identified applications of the first client device.

(M8) A method may be performed as described in any of paragraphs (M1) through (M7) wherein the first weight and the second weight are determined based on a number of times that the determining the usage score of the identified applications of the first client device is performed.

(M9) A method may be performed as described in any of paragraphs (M1) through (M8) further comprising: receiving, by the computing device and from a directory service, data indicating a plurality of user groups; determining, by the computing device and from the plurality of user groups, a first user group associated with the first client device; and determining, by the computing device and from the plurality of user groups, one or more second user groups associated with similar group application usage attributes as the first user group; wherein the other client devices are associated with users of the one or more second user groups.

(M10) A method may be performed as described in any of paragraphs (M1) through (M9) wherein the determining the one or more second user groups comprises: determining, by the computing device and for a second user group of the one or more second user groups, a set of applications used by the second user group; and determining, by the computing device, that a degree of overlap between the set of applications used by the second user group and a set of applications used by the first user group satisfies a threshold degree of overlap.

(M11) A method may be performed as described in any of paragraphs (M1) through (M10) wherein the identifying the other client devices comprises: determining, by the computing device and for a client device of the other client devices, a vector of application usage attributes, wherein the vector indicates one or more amounts of application usage time; and determining, by the computing device, a distance between the vector for the client device of the other client devices and a vector for the first client device.

(M12) A method may be performed as described in any of paragraphs (M1) through (M11) further comprising: selecting, by the computing device, from the identified applications of the first client device, and based on the usage score of the identified applications of the first client device, at least one top ranked application.

(M13) A method may be performed as described in any of paragraphs (M1) through (M12) wherein the determining the at least one recommended application comprises determining the at least one recommended application other than the at least one top ranked application.

(M14) A method may be performed as described in any of paragraphs (M1) through (M13) wherein the determining the usage score of the identified applications of the first client device is based on a type of application usage of the identified applications of the first client device.

The following paragraphs (A1) through (A3) describe examples of apparatuses that may be implemented in accordance with the present disclosure.

(A1) A computing device comprising: one or more processors; and memory storing instructions that, when executed by the one or more processors, cause the computing device to: identify applications launched by a first client device, the identification including a determination of an amount of time in which individual applications were in use on the first client device; determine a usage score of the identified applications of the first client device based on the determined amount of time in which the individual applications were in use; identify other client devices based on the determined usage score of the identified applications launched by the first client device; determine at least one recommended application to make accessible to the first client device, the at least one recommended application being an application of at least one of the identified other client devices; and provide access to the at least one recommended application via a user interface of the first client device so as to reduce time in which to launch the at least one recommended application via the first client device.

(A2) A computing device may be implemented as described in paragraph (A1) wherein the amount of time in which the individual applications were in use on the first client device indicates an amount of time during which the individual applications were outputted via an active window of a desktop of the first client device.

(A3) A computing device may be implemented as described in any of paragraphs (A1) through (A2) wherein the determining the usage score of the identified applications of the first client device is based on a previous usage score of the identified applications of the first client device.

The following paragraphs (CRM1) through (CRM3) describe examples of computer-readable media that may be implemented in accordance with the present disclosure.

(CRM1) One or more non-transitory computer readable media storing computer readable instructions that, when executed, cause a computing device to: identify applications launched by a first client device, the identification including a determination of an amount of time in which individual applications were in use on the first client device; determine a usage score of the identified applications of the first client device based on the determined amount of time in which the individual applications were in use; identify other client devices based on the determined usage score of the identified applications launched by the first client device; determine at least one recommended application to make accessible to the first client device, the at least one recommended application being an application of at least one of the identified other client devices; and provide access to the at least one recommended application via a user interface of the first client device so as to reduce time in which to launch the at least one recommended application via the first client device.

(CRM2) One or more non-transitory computer readable media may be implemented as described in paragraph (CRM1) wherein the amount of time in which the individual applications were in use on the first client device indicates an amount of time during which the individual applications were outputted via an active window of a desktop of the first client device.

(CRM3) One or more non-transitory computer readable media may be implemented as described in any of paragraphs (CRM1) through (CRM2) wherein the determining the usage score of the identified applications of the first client device is based on a previous usage score of the identified applications of the first client device.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A method comprising:
 identifying, by a computing device, applications launched by a first client device, the identification including a determination of an amount of time in which individual applications were in use on the first client device;
 determining, by the computing device, a usage score of the identified applications of the first client device based on:
  the determined amount of time in which the individual applications were in use; and
  a previous usage score of the identified applications of the first client device;
 identifying, by the computing device, other client devices based on the determined usage score of the identified applications launched by the first client device;
 determining, by the computing device, at least one recommended application to make accessible to the first client device, the at least one recommended application being an application of at least one of the identified other client devices; and
 providing, by the computing device, access to the at least one recommended application via a user interface of the first client device so as to reduce time in which to launch the at least one recommended application via the first client device.

2. The method of claim 1, further comprising:
 receiving, by the computing device and from the first client device, data indicating an application usage event;
 wherein the application usage event indicates a first application outputted via the first client device and a time interval during which the first application was outputted via the first client device.

3. The method of claim 1, wherein the amount of time in which the individual applications were in use on the first client device indicates an amount of time during which the individual applications were outputted via an active window of a desktop of the first client device.

4. The method of claim 1, wherein the amount of time in which the individual applications were in use on the first client device indicates an amount of time within a first calculation period, and wherein the determining the usage score of the identified applications of the first client device is based on one or more amounts of time within one or more second calculation periods.

5. The method of claim 4, further comprising:
 assigning, by the computing device, different weights to the amount of time within the first calculation period and the one or more amounts of time within the one or more second calculation periods;
 wherein the determining the usage score of the identified applications of the first client device is based on the different weights.

6. The method of claim 1, wherein the determining the usage score of the identified applications of the first client device comprises:
 assigning, by the computing device, a first weight to the amount of time in which the individual applications were in use on the first client device; and
 assigning, by the computing device, a second weight to the previous usage score of the identified applications of the first client device.

7. The method of claim 6, wherein the first weight and the second weight are determined based on a number of times that the determining the usage score of the identified applications of the first client device is performed.

8. The method of claim 1, further comprising:
 receiving, by the computing device and from a directory service, data indicating a plurality of user groups;

determining, by the computing device and from the plurality of user groups, a first user group associated with the first client device; and determining, by the computing device and from the plurality of user groups, one or more second user groups associated with similar group application usage attributes as the first user group;

wherein the other client devices are associated with users of the one or more second user groups.

9. The method of claim 8, wherein the determining the one or more second user groups comprises:

determining, by the computing device and for a second user group of the one or more second user groups, a set of applications used by the second user group; and determining, by the computing device, that a degree of overlap between the set of applications used by the second user group and a set of applications used by the first user group satisfies a threshold degree of overlap.

10. The method of claim 1, wherein the identifying the other client devices comprises:

determining, by the computing device and for a client device of the other client devices, a vector of application usage attributes, wherein the vector indicates one or more amounts of application usage time; and determining, by the computing device, a distance between the vector for the client device of the other client devices and a vector for the first client device.

11. The method of claim 1, further comprising:

selecting, by the computing device, from the identified applications of the first client device, and based on the usage score of the identified applications of the first client device, at least one top ranked application.

12. The method of claim 11, wherein the determining the at least one recommended application comprises determining the at least one recommended application other than the at least one top ranked application.

13. The method of claim 1, wherein the determining the usage score of the identified applications of the first client device is based on a type of application usage of the identified applications of the first client device.

14. The method of claim 13, wherein determining the usage score of the identified applications of the first client device based on the type of application usage comprises:

assigning a first weight to the application usage via an active window; and assigning a second weight to the application usage via a non-active but fully or partially displaying window.

15. A computing device comprising:

one or more processors; and memory storing instructions that, when executed by the one or more processors, cause the computing device to:

identify applications launched by a first client device, the identification including a determination of an amount of time in which individual applications were in use on the first client device;

determine a usage score of the identified applications of the first client device based on:

the determined amount of time in which the individual applications were in use; and a previous usage score of the identified applications of the first client device;

identify other client devices based on the determined usage score of the identified applications launched by the first client device;

determine at least one recommended application to make accessible to the first client device, the at least one recommended application being an application of at least one of the identified other client devices; and provide access to the at least one recommended application via a user interface of the first client device so as to reduce time in which to launch the at least one recommended application via the first client device.

16. The computing device of claim 15, wherein the amount of time in which the individual applications were in use on the first client device indicates an amount of time during which the individual applications were outputted via an active window of a desktop of the first client device.

17. One or more non-transitory computer readable media storing computer readable instructions that, when executed, cause a computing device to:

identify applications launched by a first client device, the identification including a determination of an amount of time in which individual applications were in use on the first client device;

determine a usage score of the identified applications of the first client device based on:

the determined amount of time in which the individual applications were in use; and a previous usage score of the identified applications of the first client device;

identify other client devices based on the determined usage score of the identified applications launched by the first client device;

determine at least one recommended application to make accessible to the first client device, the at least one recommended application being an application of at least one of the identified other client devices; and provide access to the at least one recommended application via a user interface of the first client device so as to reduce time in which to launch the at least one recommended application via the first client device.

18. The one or more non-transitory computer readable media of claim 17, wherein the amount of time in which the individual applications were in use on the first client device indicates an amount of time during which the individual applications were outputted via an active window of a desktop of the first client device.

* * * * *